United States Patent
Watanabe et al.

[11] Patent Number: 6,074,431
[45] Date of Patent: Jun. 13, 2000

[54] APPARATUS AND METHOD FOR AUTOMATICALLY FORMING WORK OBJECT AND RECORDING MEDIUM RECORDING WORK OBJECT FORMING PROGRAM AND CAPABLE OF BEING READ BY COMPUTER

[75] Inventors: Jun Watanabe; Haruko Hosozawa, both of Kawasaki, Japan

[73] Assignee: Fujitsu Limited, Kawasaki, Japan

[21] Appl. No.: 09/031,614

[22] Filed: Feb. 27, 1998

[30] Foreign Application Priority Data

Oct. 20, 1997 [JP] Japan .................................. 9-287061

[51] Int. Cl.[7] .............................. G06F 9/45; G06F 17/30
[52] U.S. Cl. ................................................................. 717/2
[58] Field of Search ..................................................... 717/2

[56] References Cited

U.S. PATENT DOCUMENTS

| | | | |
|---|---|---|---|
| 5,357,452 | 10/1994 | Pio-di-Savoia et al. | 371/19 |
| 5,359,546 | 10/1994 | Hayes et al. | 371/19 |
| 5,495,577 | 2/1996 | Iizawa et al. | 707/517 |
| 5,784,553 | 7/1998 | Kolawa et al. | 395/183.14 |
| 5,799,266 | 8/1998 | Hayes | 702/123 |
| 5,870,746 | 2/1999 | Knutson et al. | 707/101 |
| 5,895,477 | 4/1999 | Orr et al. | 707/517 |

OTHER PUBLICATIONS

Mithanei, An Object–Oriented Data Model for Partition Processing in Distributed Databases, ACM, p. 271–279, 1990.

Hahns et al., Ontologies for Agents, IEEE, p. 31–33, 1997.

Wang et al., Active Rule Processing in Bio Compose Database, IEEE, p. 431–437, 1998.

*Primary Examiner*—Tariq R. Hafiz
*Assistant Examiner*—John Q. Chavis
*Attorney, Agent, or Firm*—Staas & Halsey, LLP

[57] ABSTRACT

A work process is divided into data and behavior of the data and is arranged. Each data is prepared as a business object. As for the behavior of the data, a necessary parts list table (processing description file) is formed by analyzing a user construction control pattern formed by obtaining answers regarding work rules about how to handle the data by the user on the basis of a question table. A customized work object is formed from the necessary parts list table and the business object (class definition file).

19 Claims, 31 Drawing Sheets

| | 14-1 | 14-2 | 14-3 | 14-4 |
|---|---|---|---|---|
| | QUESTION No. | QUESTION SENTENCE | THE NUMBER OF QUESTION TIMES | THE NUMBER OF ANSWER PATTERNS |
| | 1 | ENTER THE NUMBER OF TIMES UNTIL THE SALES DECISION | 1 | 0 |
| | 2 | ENTER THE INPUT NAME | 3 | 0 |
| | 3 | WHEN THE OPERATOR CAN ENTER? | 2 | 5 |
| | 4 | WHICH ARE THE INPUT, DECISION, AND CHANGE CHECK ITEMS FOR WORK? | 24 | 0 |

14

| ANSWER PATTERN 14-5 | ANSWER ATTRIBUTE 14-6 | ANSWER TYPE 14-7 | NEXT QUESTION No. 14-8 | DEFAULT ANSWER 14-9 | OUTPUT DESTINATION DIVISION 14-10 |
|---|---|---|---|---|---|
| NONE | 2 | 0 | 2 | 3 | 0 |
| NONE | 1 | 0 | 3 | NONE | 0 |
| PAST (INCLUDING THE APPOINTED DAY) FUTURE (INCLUDING THE APPOINTED DAY) PAST (NOT INCLUDING THE APPOINTED DAY) FUTURE (NOT INCLUDING THE APPOINTED DAY) NO RELEVANT ITEM | 1 | 0 | 4 | NONE | 0 |
| NONE | 1 | 0 | -1 | NONE | 0 |

| 14-11 THE NUMBER OF OUTPUT DESTINATION FILES | 14-12 OUTPUT DESTINATION FILE NAME | 14-13 ANSWER DIVISION | 14-14 PROCESSING No. | 14-15 PROCESSING DESCRIPTOR |
|---|---|---|---|---|
| 1 | GloSerFieldAttr.h1 | 1 | 1 | |
| 1 | GloSerFormName.h1 | 1 | 2 | |
| 2 | GloSerDateCheckh1. GloSerDateCheckh2. | 1 | 3 | |
| 2 | GloSerSlipFieldAttr.h1 GloSerParticularFieldAttr.h1 | 1 | 4 | |

FIG. 6A

Q1 HOW MANY TIMES DO YOU ENTER UNTIL THE SALES DECISION?  3 TIMES

Q2 WHAT DO YOU CALL THE INPUT OF THE FIRST TIME?  ORDERING SCHEDULE INPUT

WHAT DO YOU CALL THE INPUT OF THE SECOND TIME?  SHIPPING INSTRUCTION INPUT

WHAT DO YOU CALL THE INPUT OF THE THIRD TIME?  SALES DECISION INPUT

Q3 WHAT ARE "INPUT DATA", "DECISION DATA", AND "CHANGEABLE DATA" OF THE FIRST TIME?

WHAT ARE "INPUT DATA", "DECISION DATA", AND "CHANGEABLE DATA" OF THE SECOND TIME?

WHAT ARE "INPUT DATA", "DECISION DATA", AND "CHANGEABLE DATA" OF THE THIRD TIME?

| | | FIRST TIME | | | SECOND TIME | | | THIRD TIME | | |
|---|---|---|---|---|---|---|---|---|---|---|
| | | INPUT | DECIDE | CHANGE | INPUT | DECIDE | CHANGE | INPUT | DECIDE | CHANGE |
| 1 | INPUT DATA | | | | | | | | | |
| 2 | SLIP No. | O | O | — | — | — | × | — | — | × |
| 3 | CUSTOMER CODE | O | O | — | — | — | × | — | — | × |
| 4 | CUSTOMER NAME | O | O | — | — | — | O | — | — | I |
| 5 | GOODS CODE | I | O | — | — | — | I | — | — | × |
| 6 | GOODS NAME | O | O | — | — | — | O | — | — | O |
| 7 | UNIT PRICE | O | O | — | — | — | O | — | — | × |
| 8 | QUANTITY | O | O | — | — | — | O | — | — | O |
| 9 | MONEY AMOUNT | O | — | — | — | — | O | — | — | × |
| 10 | SHIPPING DATE | I | I | — | — | — | O | — | — | × |
| 11 | LOCATION | I | O | — | O | O | I | — | — | × |
| 12 | TRUCK No. | I | I | — | O | O | I | — | — | × |
| 13 | DIRECT DISPATCH INSTRUCTION | I | I | — | O | O | I | — | — | × |
| 14 | INSTRUCTED FLAG | — | — | — | O | O | — | — | — | × |
| 15 | DECIDED FLAG | — | — | — | — | — | — | — | O | I |

Q4 WHEN IS THE DATE OF THE POSSIBLE FIRST-TIME INPUT?
WHEN IS THE DATE OF THE POSSIBLE SECOND-TIME INPUT?
WHEN IS THE DATE OF THE POSSIBLE THIRD-TIME INPUT?

EX)

25-2

|  | FIRST INPUT DATE | | SECOND INPUT DATE | | THIRD INPUT DATE | |
|---|---|---|---|---|---|---|
|  | INPUT | CHANGE | INPUT | CHANGE | INPUT | CHANGE |
| SHIPPING DATE ...... | A | A | A | A | C | × |

A : UNTIL THE PREVIOUS DAY

B : UNTIL THE APPOINTED DAY

C : ONLY IN THE PAST

......

| ITEM NAME | ITEM ATTRIBUTE | EXPLANATION OF ITEM |
|---|---|---|
| LIST OF CONSTRUCTION CONTROL PATTERNS | COMBO-BOX | SELECT THE CONSTRUCTION CONTROL PATTERN. |
| TO NEXT | COMMAND BUTTON | ADVANCE TO THE NEXT QUESTION PICTURE PLANE. |
| CANCEL | COMMAND BUTTON | FINISH THE CUSTOMIZATION (QUESTION PROCESS). |

FIG. 8A

64 — SALES DECIDED NUMBER DESIGNATION PICTURE PLANE ☒

66 — [QUESTION No. Q1]
ENTER THE NUMBER OF TIMES UNTIL THE SALES DECISION.

```
┌─────────────────┬─┐
│              3  │▲│
│                 │▽│
└─────────────────┴─┘
   68              70
```

| RETURN | TO NEXT | CANCEL |
|--------|---------|--------|
| 58     | 60      | 62     |

FIG. 8B

| ITEM NAME | ITEM ATTRIBUTE | EXPLANATION OF ITEM |
|-----------|----------------|---------------------|
| THE NUMBER OF TIMES | SPIN BUTTON | DESIGNATE THE NUMBER OF TIMES OF WORKS UNTIL THE SALES DECISION. |
| RETURN | COMMAND BUTTON | RETURN TO THE PREVIOUS QUESTION PICTURE PLANE. |
| TO NEXT | COMMAND BUTTON | ADVANCE TO THE NEXT QUESTION PICTURE PLANE. |
| CANCEL | COMMAND BUTTON | FINISH THE CUSTOMIZATION (QUESTION PROCESS). |

FIG. 9A

```
72 ┌─────────────────────────────────────────────┐
   │ INPUT NAME DESIGNATION              [X]     │
   │ PICTURE PLANE                               │
   ├─────────────────────────────────────────────┤
74 │   [QUESTION No. Q2]                         │
   │     ENTER THE INPUT NAME.                   │
   │                                             │
   │   FIRST  : INPUT OF                         │
   │   TIME     SCHEDULED ORDER  □□□□□□□□□□□ ─76 │
   │                                             │
   │   SECOND : INPUT OF SHIPPING                │
   │   TIME     INSTRUCTION      □□□□□□□□□□□ ─78 │
   │                                             │
   │   THIRD  : INPUT OF                         │
   │   TIME     DECIDED SALES    □□□□□□□□□□□ ─80 │
   │                                             │
   │              ┌────────┬─────────┬────────┐  │
   │              │ RETURN │ TO NEXT │ CANCEL │  │
   │              └────────┴─────────┴────────┘  │
   │                 58         60        62     │
   └─────────────────────────────────────────────┘
```

FIG. 9B

| ITEM NAME | ITEM ATTRIBUTE | EXPLANATION OF ITEM |
|---|---|---|
| WORK NAME | TEXT BOX | ENTER THE WORK NAME (BY AN AMOUNT OF THE NUMBER OF TIMES UNTIL THE SALES DECISION). |
| RETURN | COMMAND BUTTON | RETURN TO THE PREVIOUS QUESTION PICTURE PLANE. |
| TO NEXT | COMMAND BUTTON | ADVANCE TO THE NEXT QUESTION PICTURE PLANE. |
| CANCEL | COMMAND BUTTON | FINISH THE CUSTOMIZATION (QUESTION PROCESS). |

FIG. 10A

```
82
 ↘  ┌─────────────────────────────────────────────────┐
    │ DATA PROCESSING                              [X]│
    │ DESIGNATION PICTURE PLANE                       │
84  │                                                 │
 ↘  │   [QUESTION No. Q3]                             │
    │   WHICH ARE THE INPUT, DECISION, CHANGE         │
    │   CHECK ITEMS FOR THE WORK FOR THE ORDERING     │
    │   SCHEDULE INPUT?                               │
    │   ┌─────────────────────────────────────────┐   │
    │   │ ITEM         INPUT  DECIDE  CHANGE  ▲─── 88-1
    │   │           90                                │
86  │   │ SLIP No.    [v]    [v]     [v]          │   │
 ↘  │   │ BRANCH CODE [v]    [v]     [ ]          │   │
    │   │ BRANCH NAME [ ]    [v]     [ ]          │   │
    │   │ CODE OF PERSON                          │   │
    │   │ IN CHARGE   [v]    [v]     [ ]          │   │
    │   │ NAME OF PERSON                          │   │
    │   │ IN CHARGE   [ ]    [v]     [ ]          │   │
    │   │                                    90       │
    │   │                                     ▼─── 88-2
    │   └─────────────────────────────────────────┘   │
    │                    ┌──────┬────────┬──────┐     │
    │                    │RETURN│TO NEXT │CANCEL│     │
    │                    └──────┴────────┴──────┘     │
    │                       58      60      62        │
    └─────────────────────────────────────────────────┘
```

FIG. 10B

| ITEM NAME | ITEM ATTRIBUTE | EXPLANATION OF ITEM |
|---|---|---|
| INPUT | CHECK BOX | CHECK IN CASE OF ENTERING FOR ITEMS. (THE NUMBER OF ITEMS × THE NUMBER OF TIMES UNTIL THE SALES DECISION) |
| DECISION | CHECK BOX | CHECK IN CASE OF DECIDING ITEMS. (THE NUMBER OF ITEMS × THE NUMBER OF TIMES UNTIL THE SALES DECISION) |
| CHANGE | CHECK BOX | CHECK IN CASE OF CHANGING ITEMS. (THE NUMBER OF ITEMS × THE NUMBER OF TIMES UNTIL THE SALES DECISION) |
| RETURN | COMMAND BUTTON | RETURN TO THE PREVIOUS QUESTION PICTURE PLANE OR THE DATA INSTRUCTING PROCESS FOR THE PREVIOUS WORK. |
| TO NEXT | COMMAND BUTTON | ADVANCE TO THE NEXT QUESTION PICTURE PLANE OR THE DATA INSTRUCTING PROCESS FOR THE NEXT WORK. |
| CANCEL | COMMAND BUTTON | FINISH THE CUSTOMIZATION (QUESTION PROCESS). |

FIG. 11A

| | |
|---|---|
| 92 — DATE CONFIRMATION PICTURE PLANE | ☒ |

94 — [QUESTION No. Q4]
WHEN IS THE DATE OF POSSIBLE INPUT?

95 — INPUT DATE ......................... 96

| | |
|---|---|
| ORDERING SCHEDULE INPUT | IN THE PAST (APPOINTED DAY IS INCLUDED) ▼ — 102 |
| SHIPPING INSTRUCTION INPUT | IN THE PAST (APPOINTED DAY IS INCLUDED) ▼ — 104 |
| SALES DECISION INPUT | NONE ▼ — 106 |

100    98

| RETURN | TO NEXT | CANCEL |
|---|---|---|
| 58 | 60 | 62 |

FIG. 11B

| ITEM NAME | ITEM ATTRIBUTE | EXPLANATION OF ITEM |
|---|---|---|
| CHECK DATE | COMBO-BOX | SELECT THE DATE WHEN THE OPERATOR CAN ENTER. (THE NUMBER OF ITEMS × THE NUMBER OF TIMES UNTIL THE SALES DECISION) |
| RETURN | COMMAND BUTTON | RETURN TO THE PREVIOUS QUESTION PICTURE PLANE. |
| TO NEXT | COMMAND BUTTON | ADVANCE TO THE NEXT QUESTION PICTURE PLANE. |
| CANCEL | COMMAND BUTTON | FINISH THE CUSTOMIZATION (QUESTION PROCESS). |

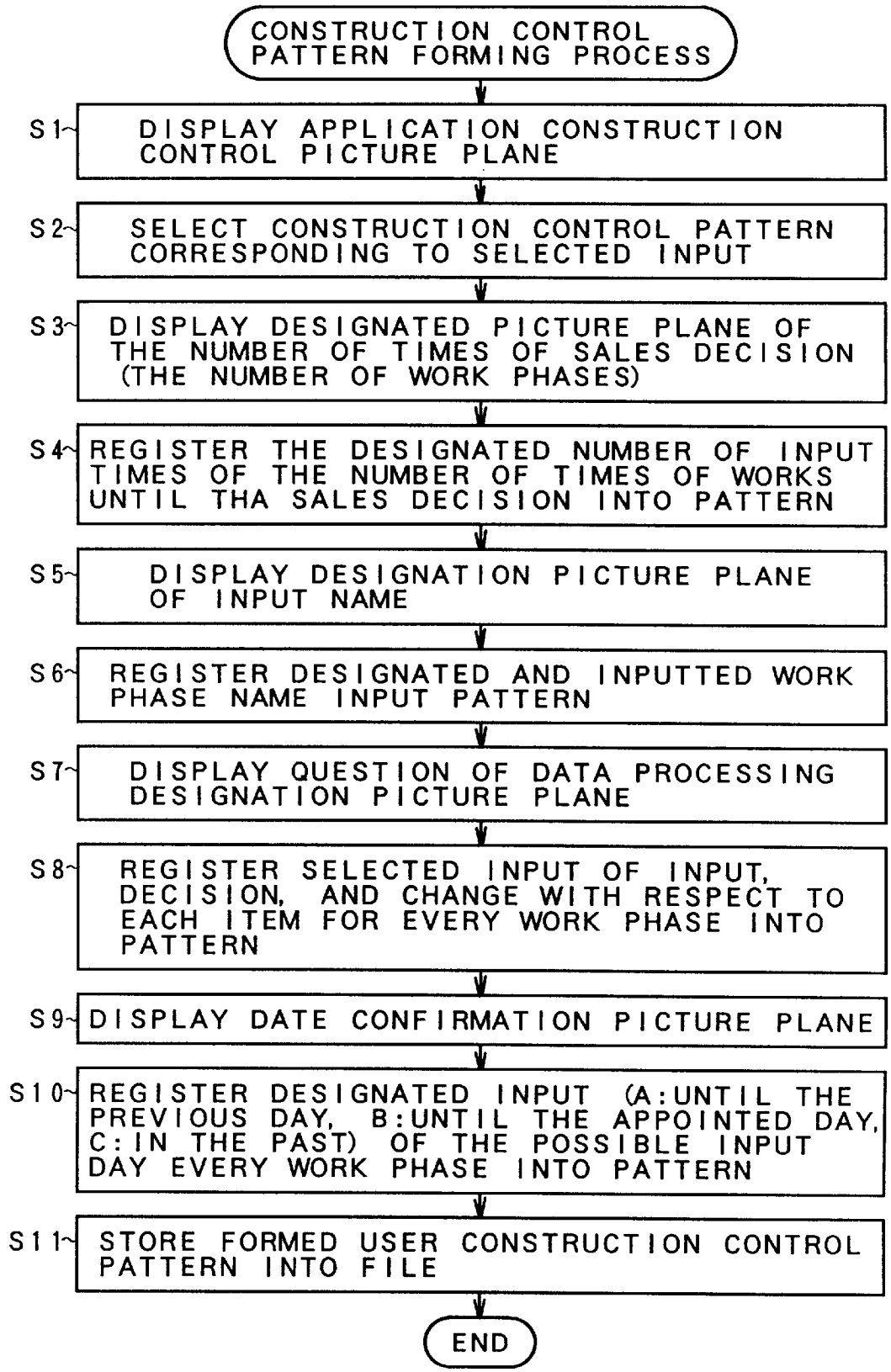

| QUESTION No. 20-1 | THE NUMBER OF QUESTIONS 20-2 | ANSWER ATTRIBUTE 20-3 | OUTPUT DESTINATION DIVISION 20-4 | THE NUMBER OF OUTPUT DESTINATION FILES 20-5 |
|---|---|---|---|---|
| 1 | 1 | 2 | 0 | 1 |
| 2 | 3 | 1 | 0 | 1 |
| 3 | 2 | 1 | 0 | 2 |
| 4 | 24 | 1 | 0 | 2 |

20

| OUTPUT DESTINATION FILE NAME<br>20-6 | ANSWER DIVISION<br>20-7 | PROCESSING No.<br>20-8 | PROCESSING DESCRIPTOR<br>20-9 | THE NUMBER OF ANSWERS<br>20-10 |
|---|---|---|---|---|
| GloSerFieldAttr.h1 | 1 | 1 | | 1 |
| GloSerFormName.h1 | 1 | 2 | | 3 |
| GloSerDateCheckh1<br>GloSerDateCheckh2 | 1 | 3 | | 1 |
| GloSerSlipFieldAttr.h1<br>GloSerParticularFieldAttr.h1 | 1 | 4 | | 1 |

| | ANSWER INFORMATION |
|---|---|
| 3 | |
| | ORDERING SCHEDULE INPUT<br>SHIPPING INSTRUCTION INPUT<br>SALES DECISION INPUT |
| | INPUT DATE     A A A<br>SHIPPING DATE   A A C |
| | 0.GloDefFieldOrderSlipDivision.CHAR.FALSE.FALSE.FALSE.FALSE.FALSE.FALSE.FALSE.FALSE.<br>0.GloDefFieldOrderSlipDiviName.CHAR.FALSE.FALSE.FALSE.FALSE.FALSE.FALSE.FALSE.FALSE.<br>0.GloDefFieldOrderSlipDealDivision.CHAR.FALSE.FALSE.FALSE.FALSE.FALSE.FALSE.FALSE.FALSE.<br>0.GloDefFieldOrderSlipDealName.CHAR.FALSE.FALSE.FALSE.FALSE.FALSE.FALSE.FALSE.FALSE.<br>0.GloDefFieldOrderSlipNumber.CHAR.TRUE.TRUE.TRUE.TRUE.FALSE.FALSE.FALSE.FALSE.<br>0.GloDefFieldOrderSlipBranchCode.CHAR.TRUE.TRUE.TRUE.TRUE.FALSE.TRUE.FALSE.FALSE.<br>0.GloDefFieldOrderSlipBranchName.CHAR.TRUE.TRUE.TRUE.TRUE.FALSE.TRUE.FALSE.FALSE.<br>0.GloDefFieldOrderSlipChargeCode.CHAR.TRUE.TRUE.TRUE.TRUE.FALSE.TRUE.FALSE.FALSE.<br>0.GloDefFieldOrderSlipChargeName.CHAR.TRUE.TRUE.TRUE.TRUE.FALSE.TRUE.FALSE.FALSE.<br>0.GloDefFieldOrderSlipCustomerCode.CHAR.TRUE.TRUE.TRUE.TRUE.FALSE.TRUE.FALSE.FALSE.<br>0.GloDefFieldOrderSlipCustomerName.CHAR.TRUE.TRUE.TRUE.TRUE.FALSE.TRUE.FALSE.FALSE.<br>0.GloDefFieldOrderSlipDestCode.CHAR.TRUE.TRUE.TRUE.TRUE.FALSE.TRUE.FALSE.FALSE.<br>0.GloDefFieldOrderSlipDestName.CHAR.TRUE.TRUE.TRUE.TRUE.FALSE.TRUE.FALSE.FALSE.<br>1.GloDefFieldOrderParticGoodsCode.CHAR.TRUE.TRUE.TRUE.TRUE.FALSE.TRUE.FALSE.TRUE.<br>1.GloDefFieldOrderParticGoodsName.CHAR.TRUE.TRUE.TRUE.TRUE.FALSE.TRUE.FALSE.FALSE.<br>1.GloDefFieldOrderParticUnitPrice.CHAR.TRUE.TRUE.TRUE.TRUE.FALSE.TRUE.FALSE.FALSE.<br>1.GloDefFieldOrderParticQuantity.CHAR.TRUE.TRUE.TRUE.TRUE.FALSE.TRUE.FALSE.FALSE.<br>1.GloDefFieldOrderParticPrice.CHAR.TRUE.TRUE.TRUE.FALSE.FALSE.TRUE.FALSE.FALSE.<br>0.GloDefFieldOrderSlipInputDate.DATE.TRUE.FALSE.FALSE.TRUE.FALSE.FALSE.FALSE.FALSE.<br>0.GloDefFieldOrderSlipShipDate.DATE.TRUE.TRUE.FALSE.TRUE.TRUE.FALSE.FALSE.FALSE.<br>0.GloDefFieldOrderSlipStatusFlg.DATE.FALSE.FALSE.FALSE.TRUE.FALSE.FALSE.FALSE.FALSE.<br>1.GloDefFieldOrderParticLocation.CHAR.FALSE.FALSE.FALSE.TRUE.FALSE.FALSE.FALSE.FALSE.<br>1.GloDefFieldOrderParticTruckNo.CHAR.FALSE.FALSE.FALSE.TRUE.TRUE.FALSE.FALSE.FALSE.<br>1.GloDefFieldOrderParticDeliveFlg.CHAR.FALSE.FALSE.FALSE.TRUE.TRUE.TRUE.FALSE.FALSE. |

21-1, 21-2, 21-3, 21-4

FIG. 15A
108
```
#define INPUTNUM 3          //THE NUMBER OF TIMES OF WORKS
#define SLIPFIELDNUM 12     //THE NUMBER OF SLIP ITEMS
#define PARTICULARFIELDNUM 8 //THE NUMBER OF SPECIFICATION ITEMS
```

FIG. 15B
110
```
#define DATECHECKNUM 2     //THE NUMBER OF DATE CHECK ITEMS
```

FIG. 15C
112
```
"ORDERING SCHEDULE INPUT"
"SHIPPING INSTRUCTION INPUT"
"SALES DECISION INPUT"
```

{ "SLIP NO.", "CHAR", [[TRUE,TRUE,TRUE],[TRUE,FALSE,FALSE],[TRUE,FALSE,FALSE]]},
{ "BRANCH CODE", "CHAR", [[TRUE,TRUE,TRUE],[TRUE,FALSE,FALSE],[TRUE,FALSE,FALSE]]},
{ "BRANCH NAME", "CHAR", [[TRUE,TRUE,TRUE],[TRUE,FALSE,FALSE],[TRUE,FALSE,FALSE]]},
{ "CODE OF PERSON IN CHARGE", "CHAR", [[TRUE,TRUE,TRUE],[TRUE,FALSE,FALSE],[TRUE,FALSE,FALSE]]},
{ "NAME OF PERSON IN CHARGE", "CHAR", [[TRUE,TRUE,TRUE],[TRUE,FALSE,FALSE],[TRUE,FALSE,FALSE]]},
{ "CUSTOMER CODE", "CHAR", [[TRUE,TRUE,TRUE],[FALSE,FALSE,TRUE],[FALSE,FALSE,FALSE]]},
{ "CUSTOMER NAME", "CHAR", [[TRUE,TRUE,TRUE],[TRUE,FALSE,FALSE],[TRUE,FALSE,TRUE]]},
{ "DELIVERY DESTINATION CODE", "CHAR", [[TRUE,TRUE,TRUE],[TRUE,FALSE,TRUE],[FALSE,FALSE,FALSE]]},
{ "DELIVERY DESTINATION NAME", "CHAR", [[TRUE,TRUE,TRUE],[TRUE,FALSE,TRUE],[FALSE,FALSE,FALSE]]},
{ "INPUT DATE", "CHAR", [[TRUE,TRUE,TRUE],[TRUE,FALSE,FALSE],[TRUE,FALSE,FALSE]]},
{ "SHIPPING DATE", "CHAR", [[TRUE,TRUE,TRUE],[FALSE,FALSE,FALSE],[FALSE,FALSE,FALSE]]},
{ "DECIDED FLAG", "CHAR", [[FALSE,FALSE,TRUE],[FALSE,FALSE,FALSE],[FALSE,FALSE,TRUE]]}

{ "GOODS CODE", "CHAR", [[TRUE,TRUE,TRUE],[FALSE,FALSE,TRUE],[FALSE,FALSE,FALSE]]},
{ "GOODS NAME", "CHAR", [[TRUE,TRUE,TRUE],[FALSE,FALSE,TRUE],[FALSE,FALSE,TRUE]]},
{ "UNIT PRICE", "CHAR", [[TRUE,FALSE,TRUE],[FALSE,FALSE,FALSE],[FALSE,FALSE,TRUE]]},
{ "QUANTITY", "CHAR", [[TRUE,TRUE,TRUE],[FALSE,FALSE,FALSE],[FALSE,FALSE,TRUE]]},
{ "MONEY AMOUNT", "CHAR", [[TRUE,FALSE,FALSE],[FALSE,FALSE,TRUE],[FALSE,FALSE,TRUE]]},
{ "LOCATION NO.", "CHAR", [[FALSE,FALSE,FALSE],[FALSE,FALSE,TRUE],[TRUE,TRUE,TRUE]]},
{ "TRUCK NO.", "CHAR", [[FALSE,FALSE,FALSE],[FALSE,FALSE,TRUE],[TRUE,TRUE,TRUE]]},
{ "DIRECT DISPATCH INSTRUCTION", "CHAR", [[FALSE,FALSE,TRUE],[FALSE,FALSE,TRUE],[FALSE,FALSE,FALSE]]}

{ "INPUT DATE", 'A','A','A' }
{ "SHIPPING DATE", 'C','C','C' }

FIG.16A

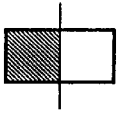

```
120  //CUSTOMIZING DEFINITION FILE
     #include "GloSerFieldAttr.h1"          //THE NUMBER OF TIMES OF WORKS,THE NUMBER OF SLIP ITEMS,
                                              THE NUMBER OF SPECIFICATION ITEMS
     #include "GloSerDateCheck.h1"          //THE NUMBER OF DATE CHECK ITEMS //ITEM DEFINITION TABLE
122  typedef struct {
       char* FieldName;                     //ITEM NAME
       char* Attribute;                     //ITEM ATTRIBUTE
       INPUTATTRIB Input[INPUTNUM];         //INPUT DECISION TABLE
     } SLIPFIELDATTRIB;
     typedef SLIPFIELDATTRIB PARTICULARFIELDATTRIB;

//DATE CHECK PATTERN TABLE
124  typedef struct {
       char* FieldName;                     //ITEM NAME
       char* DateCheckPattern[INPUTNUM];    //DATE CHECK PATTERN
     } DATECHECKPATTERN;
```

FIG. 16B

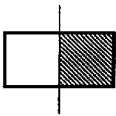

```
      //WORK INPUT NAME TABLE
125   char* *FormName[INPUTNUM]= {                //WORK INPUT NAME
        #include "GloSerFormName.h1"
      } :

//WORK DECISION RULE TABLE (SLIP)
126   SLIPFIELDATTRIB slipFieldAttr[SLIPFIELDNUM]= {       //SLIP ITEM INPUT CHECK
        #include "GloSerSlipFieldAttr.h1"
      } :

//WORK DECISION RULE TABLE (SPECIFICATION)
128   PARTICULARFIELDATTRIB particularFieldAttr[PARTICULARFIELDNUM]= {    //SPECIFICATION ITEM INPUT CHECK
        #include "GloSerParticularFieldAttr.h1"
      } :

//DATE CHECK PATTERN RULE
130   DATECHECKPATTERN DateCheckPat[DATECHECKNUM]= {       //DATE CHECK PROCESSING PATTERN
        #include "GloSerDateCheckh2"
      } :
```

| PARTS No. | FIRST TIME | SECOND TIME |
|---|---|---|
| PART 1 | ○○− | −−× |
| PART 2 | ○○− | −−× |
| PART 3 | ○○− | −−× |
| ⋮ | ⋮ | ⋮ |
| PART 15 | −−− | −○− |

20

40-11

OBJECT

READ

CALL PART 1

CALL PART 2

CALL PART 3

⋮　　　⋮

CALL PART 14

40-12

OBJECT

READ

CALL PART 7

CALL PART 9

CALL PART 15

FIG.19A

Q1 HOW MANY TIMES DO YOU ENTER UNTIL THE SALES DECISION?  2 TIMES

Q2 WHAT DO YOU CALL THE INPUT OF THE FIRST TIME?  ORDERING SHIPPING INPUT

WHAT DO YOU CALL THE INPUT OF THE SECOND TIME?  SALES DECISION INPUT

Q3 WHAT ARE "INPUT DATA", "DECISION DATA", AND "CHANGEABLE DATA" OF THE FIRST TIME?

WHAT ARE "INPUT DATA", "DECISION DATA", AND "CHANGEABLE DATA" OF THE SECOND TIME?

42

|  | FIRST TIME 26-11 | | | | SECOND TIME 26-12 | | | |
|---|---|---|---|---|---|---|---|---|
|  | INPUT | DECIDE | CHANGE | | INPUT | DECIDE | CHANGE | |
| 1 INPUT DATA | — | — | — | | — | — | — | |
| 2 SLIP No. | ○ | ○ | — | | — | — | × | |
| 3 CUSTOMER CODE | ○ | ○ | — | | — | — | × | |
| 4 CUSTOMER NAME | ○ | ○ | — | | — | — | × | |
| 5 GOODS CODE | — | ○ | — | | — | — | | | 
| 6 GOODS NAME | ○ | ○ | — | | — | — | × | |
| 7 UNIT PRICE | — | ○ | — | | — | — | ○ | |
| 8 QUANTITY | ○ | ○ | — | | — | — | × | |
| 9 MONEY AMOUNT | ○ | ○ | — | | — | — | ○ | |
| 10 SHIPPING DATE | ○ | ○ | — | | — | — | × | |
| 11 LOCATION | ○ | ○ | — | | — | — | × | |
| 12 TRUCK No. | ○ | ○ | — | | — | — | × | |
| 13 DIRECT DISPATCH INSTRUCTION | ○ | ○ | — | | — | — | × | |
| 14 INSTRUCTED FLAG | — | ○ | — | | — | — | × | |
| 15 DECIDED FLAG | — | — | — | | — | ○ | — | |

25-3

Q4 WHEN IS THE DATE OF THE POSSIBLE FIRST-TIME INPUT?
WHEN IS THE DATE OF THE POSSIBLE SECOND-TIME INPUT?

EX)

| SHIPPING DATE ...... | FIRST INPUT DATE | | SECOND INPUT DATE | |
|---|---|---|---|---|
| | INPUT | CHANGE | INPUT | CHANGE |
| | A | A | C | × |

25-4

A : UNTIL THE PREVIOUS DAY

B : UNTIL THE APPOINTED DAY

C : ONLY IN THE PAST

......

APPARATUS AND METHOD FOR AUTOMATICALLY FORMING WORK OBJECT AND RECORDING MEDIUM RECORDING WORK OBJECT FORMING PROGRAM AND CAPABLE OF BEING READ BY COMPUTER

BACKGROUND OF THE INVENTION

The invention relates to apparatus and method for automatically forming a work object written by an object-oriented language. More particularly, the invention relates to apparatus and method for automatically forming a work object without being conscious of an object-oriented language by correlating parts objects indicative of data of a work process with a parts list table which is designated by the user and which indicates behaviors of data. The invention also relates to a recording medium in which a work object forming program has been recorded and which can be read by a computer.

Hitherto, in a package of a work program for executing a work process which is provided to the user, parameters such as data items, work rules, work flow, and the like are analyzed for a specific work system of a particular enterprise as a target and a work program is designed so as to satisfy the analyzed work contents. Therefore, the work process to be executed by the work program is fixed.

Generally, the work process of the user is not fixed but it is necessary to always improve the work process because of various factors such as organization change and improvement of efficiency. In association with the improvement, it is also necessary to change the work program. In the conventional work program for processing the work process, when data items, work rules, and work flow of the work process are changed, a correction of a source program, a parameter setting, or the like is performed in order to cope with such a change. However, when the operator corrects the source program or sets the parameters, if he is not familiar with the package of the work program, he cannot change to the work process requested by the user. It is difficult to customize the work process.

SUMMARY OF THE INVENTION

According to the invention, there are provided apparatus and method for automatically forming a work object customized in accordance with a user request without needing a deep understanding with respect to an object-oriented language or a program package.

A work object automatic forming apparatus of the invention comprises: a user construction control pattern forming module; a user construction control pattern analyzing module; and an object forming module. The user construction control pattern forming module divides a work process into data and behavior of the data and correlates the data with the behavior of the data on the basis of answers of the user to a question table, thereby forming a user construction control pattern in which work rules necessary to realize a work has been defined. The user construction control pattern analyzing module analyzes the user construction control pattern and forms a necessary parts list table which is necessary to form the work object to which the work rules answered by the user is reflected. The object forming module forms the work object on the basis of a business object serving as a standard model for realizing data and behavior of data which construct the work process and the necessary parts list table. As mentioned above, according to the invention, the work process is arranged by dividing into the data and the behavior of the data, the data is prepared as a business object, and as for the behavior of the data, the answer regarding the work rules about how to handle the data is obtained from the user by using the question table, thereby forming the necessary parts list table. Consequently, customized work objects are formed from the necessary parts list table and the business object. Therefore, by merely using the method whereby the user answers to the question table, namely, by merely changing the work rules without needing the source correction or parameter setting the work object corresponding to the changed work rules can be automatically formed. The answers to the question table hide the processes which require an advanced skill regarding the object-oriented language such as C++ or the like and a deep understanding for the package, a customized work application can be easily formed by merely defining the work rules in the form of answers to the question.

On the basis of the answers of the user to the question table, the user construction control pattern forming module forms the user construction control pattern in which the number (N) of processing times from the start of the work until the completion of the work is defined. This number of processing times is defined as a "phase". For example, a series of works from the input of a slip to the summing of sales are divisionally defined by phase 1, phase 2, and phase 3, in which the number (N) of processing times (N=3 times). In this case, the user construction control pattern analyzing module divisionally forms a list table of parts objects necessary to form the work object every phase. The object forming module divisionally forms (N) work objects every phase. As mentioned above, one work process is divided into an arbitrary number (N) of phases in accordance with the user answers to the question table and the work rules (necessary parts list table) about how to handle the business object at each phase by which flow can be freely defined, so that it is possible to cope with a change request of the work process with extremely high flexibility and degree of freedom.

The user construction control pattern forming module defines, for example, the number (N) of inputting times as the number of phases from the start of the work until the completion of the work on the basis of the user answers to the question table and, in this case, forms a user construction control pattern in which the input name of every number of inputting times, the input possible date which is checked every number of inputting times, and the work rules of every plurality of data have been defined. The user construction control pattern analyzing module analyzes the user construction control pattern and forms a processing description file as a parts object list table corresponding to each of the number of inputting times, input name of every number of processing times, input possible date, and work rules. The user construction control pattern forming module forms a user construction control pattern in which the presence or absence of the input, the presence or absence of the decision, and the presence or absence of the change were defined as work rules on the basis of the user answers. The user construction control pattern analyzing module analyzes the user construction control pattern and also forms a processing description file corresponding to each of the presence or absence of the input, the presence or absence of the decision, and the presence or absence of the change defined as work rules.

As a specific work process, in case of the work process in which after goods were ordered and shipped, sales are summed, the user construction control pattern forming module defines ordering data, shipping instruction data, and sales decision data as data of the work process. As ordering data, an inputting date, a slip number, a customer code, a customer name, a goods code, a goods name, a unit price, a quantity, a money amount, and the like are defined. As shipping instruction data, a shipping date, a location, a track number, a direct dispatch instruction, an instructed flag, and the like are defined. Further, as sales decision data, a decision flag is defined. The user construction control pattern forming module further selectively defines any one of the previous day, appointed day, past, and the like as an inputting possible date on the basis of the shipping date as a reference every number of inputting times, thereby allowing a date checking process to be executed. The user construction control pattern forming module forms a user construction control pattern by correcting a prepared standard construction control pattern on the basis of the answers of the user to the question table. The object forming module has: a class definition file in which the business object serving as a standard model has been defined and stored as a class; and a class definition file forming module for forming a class definition file for user which was customized in the class definition file while including the processing description file as a necessary parts list table formed by the user construction control pattern analyzing module. The object forming module compiles the class definition file for user and forms the work objects of the number corresponding to the number of processing times.

According to the invention, there is provided a work object automatic forming method comprising:

a user construction control pattern forming step of dividing a work process into data and behavior of the data and correlating the data with the behavior of the data on the basis of answers of the user to the question table, thereby forming a user construction control pattern in which work rules necessary to realize a work have been defined;

a user construction control pattern analyzing step of analyzing the user construction control pattern and forming a necessary parts list table (description processing file) which is necessary to form a work object to which the work rules answered by the user are reflected; and an object forming step of forming customized work objects on the basis of a business object to realize the data and the behavior of the data constructing a work process and the necessary parts list table.

Further, according to the invention, there is provided a recording medium in which a work object forming program has been recorded and which can be read by a computer, wherein the work object forming program has:

a user construction control pattern forming module for dividing a work process into data and behavior of the data, correlating the data with the behavior of the data on the basis of answers of the user to a question table, defining work rules necessary to realize a work, and forming a user construction control pattern in which the number of processing times until the completion of the work has been defined on the basis of the answers of the user to the question table;

a user construction control pattern analyzing module for analyzing the user construction control pattern and forming a necessary parts list table (processing description file) which is necessary to form a work object to which the work rules answered by the user are reflected every number of processing times; and an object forming module for divisionally forming customized work objects on the basis of a business object to realize the data and the behavior of the data constructing the work process and a work object and the necessary parts list table every number of processing times.

The above and other objects, features, and advantages of the present invention will become more apparent from the following detailed description with reference to the drawings.

BRIEF DESCRIPTION OF THE DRAWINGS

FIGS. 6A and 6B are explanatory diagrams of a question table formed in correspondence to FIG. 3 and answer results;

FIGS. 8A and 8B are explanatory diagrams of a sales decided number designation picture plane and picture plane items based on the question table;

FIGS. 9A and 9B are explanatory diagrams of an input name designation picture plane and picture plane items based on the question table;

FIGS. 10A and 10B are explanatory diagrams of a data processing designation picture plane and picture plane items based on the question table;

FIGS. 11A and 11B are explanatory diagrams of a date confirmation designation picture plane and picture plane items based on the question table;

FIG. 12 is a flowchart for a user construction control pattern forming process in FIG. 1;

FIG. 14 is an explanatory diagram of the user construction control pattern which follows from FIGS. 13A and 13B;

FIGS. 15A to 15F are explanatory diagrams of a processing description file formed by analyzing the user construction control pattern in FIGS. 13A, 13B, and 14;

FIGS. 16A and 16B are explanatory diagrams of a class definition file for user including processing technique files of FIGS. 15A to 15F;

FIGS. 19A and 19B are explanatory diagrams of the question tables and answer results formed in correspondence to FIGS. 18A and 18B;

DETAILED DESCRIPTION OF THE PREFERRED EMBODIMENTS

Figure 1:
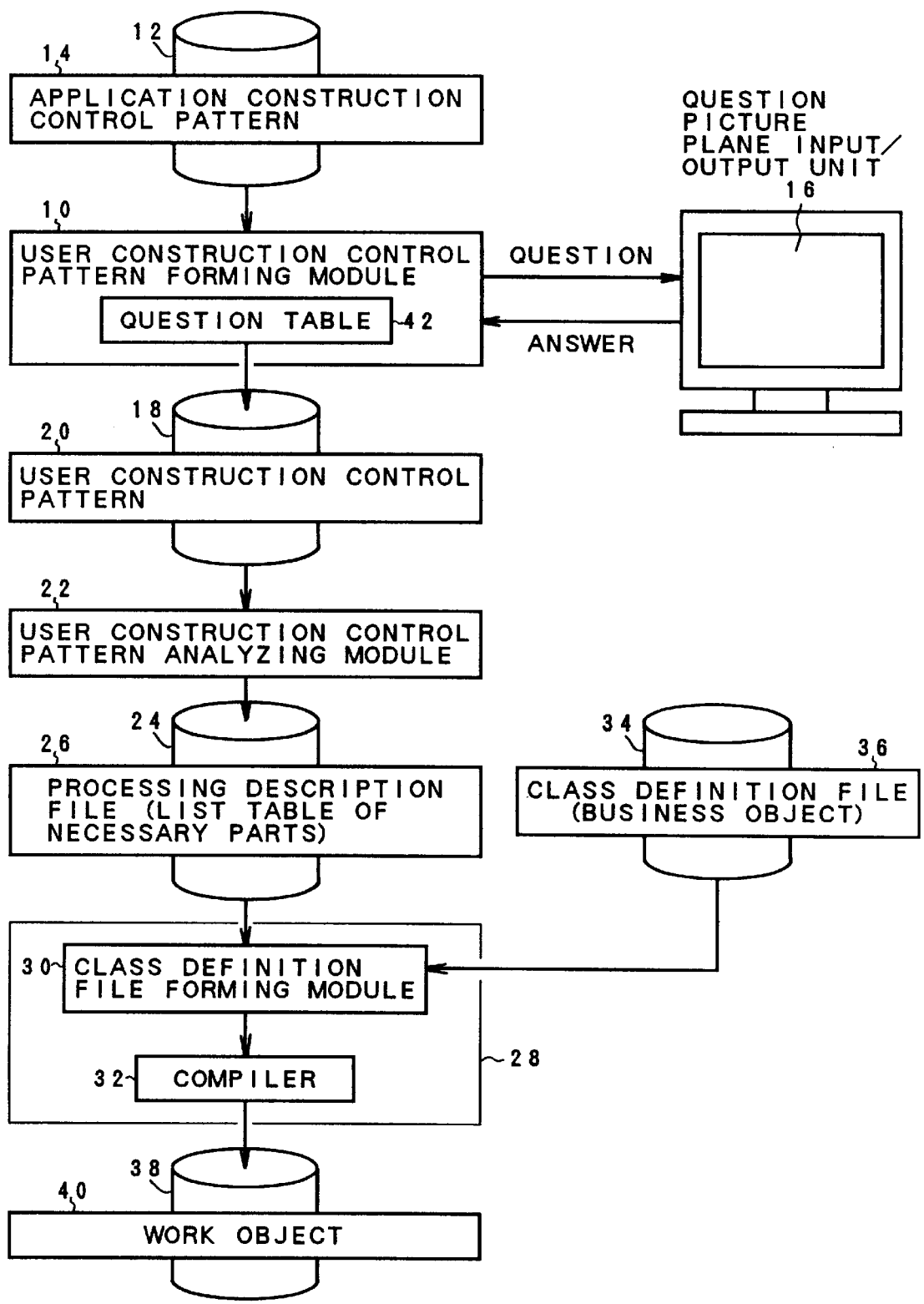
FIG. 1 is a block diagram of a functional construction of the invention.

FIG. 1 is a functional block diagram of an apparatus for automatically forming a work object according to the invention. The automatic forming apparatus of the work object of the invention is constructed by: a user construction control pattern forming module 10; a user construction control pattern analyzing module 22; and an object forming module 28. A class definition file forming module 30 and a compiler 32 are provided for the object forming module 28 among them. The user construction control pattern forming module 10 reads out an application construction control pattern 14 which has previously been stored in a file 12, obtains answers from the user by using a question table 42 obtained from the application construction control pattern 14 and by displaying questions to a question picture plane input/output unit 16 on a monitor, forms a user construction control pattern 20 obtained by correcting the application construction control pattern 14 on the basis of the answer results for the question table 42, and stores into a file 18. That is, according to the invention, an arbitrary work process as a forming target of the work object is divided into data and behavior of the data and the data and the behavior of the data are correlated on the basis of the answers of the user to the question table 42, thereby forming the user construction control pattern 20 in which work rules necessary to realize a work have been defined. Therefore, it can be said that the application construction control pattern 14 which has been prepared in the file 12 is a standard construction control pattern before the user answers are obtained, so that a result to which the user answers to the question table 42 are reflected becomes the user construction control pattern 20. The user construction control pattern 20 formed on the basis of the user answer to the question table 42 by the user construction control pattern forming module 10 is sent to the user construction control pattern analyzing module 22. By analyzing the answers to the question table 42, the user construction control pattern analyzing module 22 forms a processing description file 26 serving as a necessary parts list table which is necessary to form work objects 40 to which the work rules answered by the user are reflected and stores it to a file 24. On the other hand, a class definition file 36 functioning as a library of the business object has been prepared in a file 34. The class definition file 36 executes a class definition to enable each data which was divided into the work processes to be used as a business object. The class definition file forming module 30 of the object forming module 28 reads out the class definition file 36 from the file 34 and allows the processing description file 26 formed by the user construction control pattern analyzing module 22 to be included into the class definition file 36 which has been prepared as a business object of a standard model, thereby forming a class definition file for user which is necessary to form the work objects to which the work rules answered by the user are reflected. The class definition file for user formed by the class definition file forming module 30 is sent to the compiler 32. By compiling the class definition file for user, the compiler 32 forms the work object 40 described by assembler codes on the basis of the class definition file for user described by the object-oriented language such as C++ or the like and stores it into a file 38. That is, the object forming module 28 forms the work object 40 customized on the basis of the class definition file 36 as a business object (standard model) to realize data and behavior of the data constructing the work process which is given as a class definition file 36 and the processing description file 26 serving as a necessary parts list table which is necessary to form the work object. In this instance, in the user construction control pattern forming module 10, the number (N) of work phases serving as the number of processing times from the start to the end of the work is inquired by the question table 42, thereby forming the user construction control pattern 20 in which the number (N) of work phases answered by the user has been defined. As mentioned above, when the number (N) of work phases from the start to the end of the work is defined in the user construction control pattern 20, the user construction control pattern analyzing module 22 divisionally forms the processing description file 26 as a necessary parts list table which is necessary to form the work objects every work phase defined on the basis of the user answers. Further, the object forming module 28 divisionally forms the work object 40 every work phase defined on the basis of the user answers.

Figure 2:
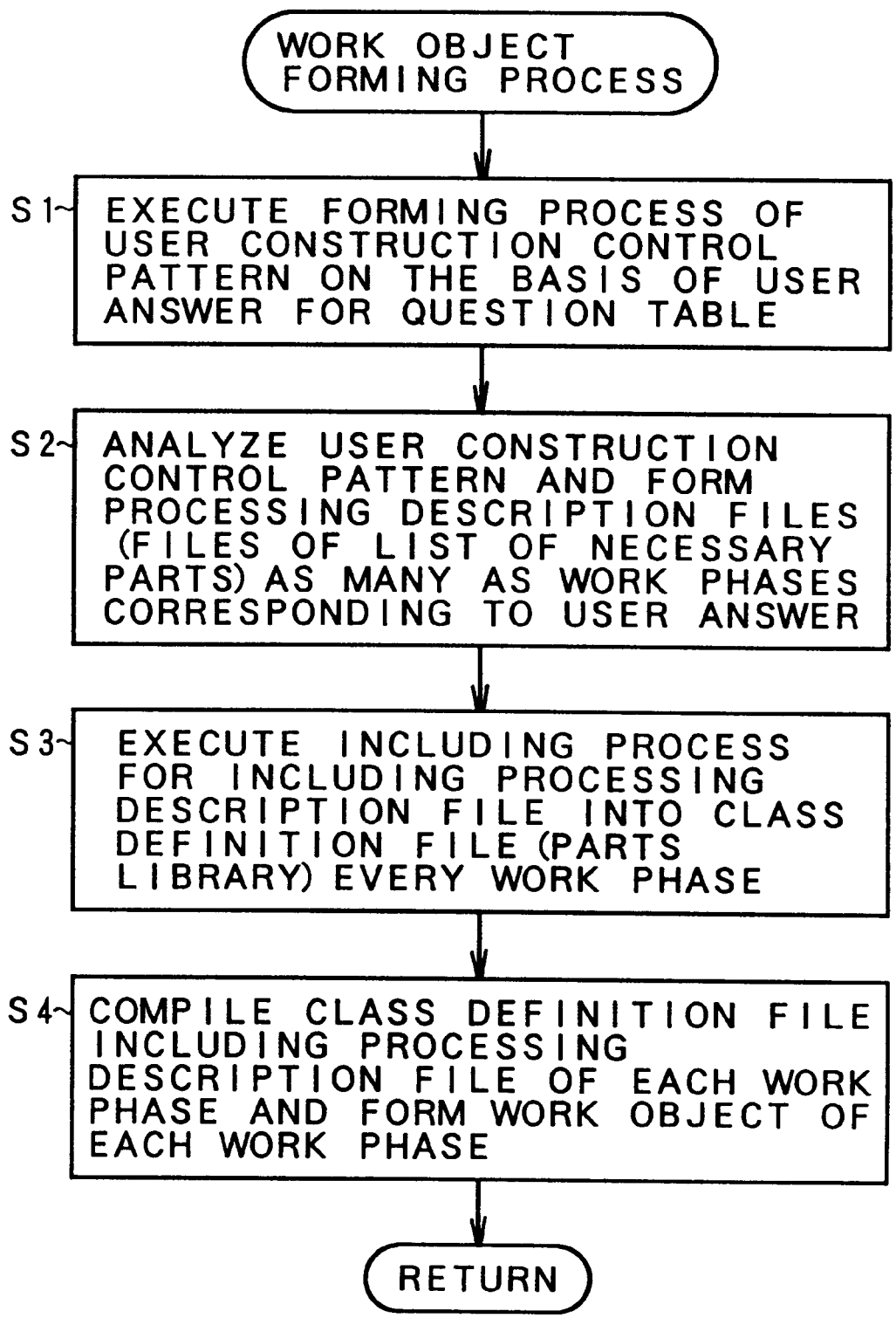
FIG. 2 is a flowchart for a work object forming process according to the invention.

FIG. 2 is a flowchart for the work object forming process in FIG. 1. First in step S1, the user construction control pattern forming module 10 displays the question table 42 obtained from the application construction control pattern 14 to the user by the question picture plane input/output unit 16. The user construction control pattern 20 in which the work rules necessary to realize the work have been defined by the correlation when the work process is divided into the data and the behavior of the data is formed on the basis of the user answers to the question picture plane input/output unit 16. Subsequently in step S2, the user construction control pattern analyzing module 22 analyzes the user construction control pattern 20, specifically, analyzes the answer results of the user to the question table 42, and forms the processing description file 26 serving as a necessary parts list table corresponding to each of the number (N) of work phases defined as the number of processing times from the start to the end of the work in the user answers. In step S3, an including process to include the processing description file 26 formed every work phase into the class definition file 36 which has been prepared is executed by the class definition file forming module 30, thereby forming the class definition file for user. Finally in step S4, the compiler 32 compiles the class definition file for user in which the processing description file has been included every work phase and forms the work object 40 of each work phase.

Figure 3:
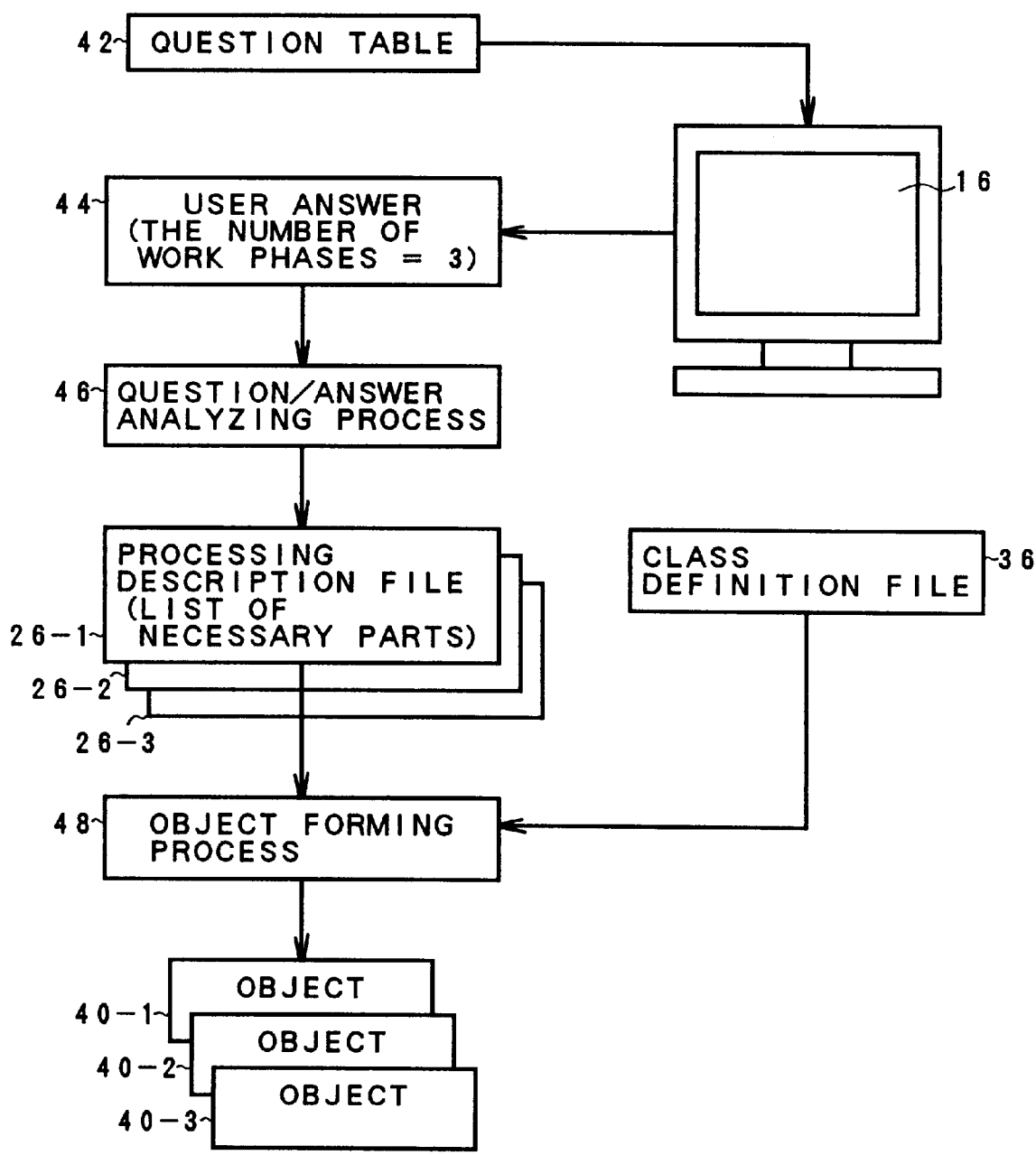
FIG. 3 is an explanatory diagram of the work object forming process in case of a standard answer when the number (N) of work phases is set to (N=3)

FIG. 3 shows processing contents of the work object forming process based on the standard answer in which the number (N) of work phases is equal to 3 by the work object automatic forming apparatus in FIG. 1. First, the question table 42 is presented to the question picture plane input/output unit 16 and user answers 44 are obtained. Since the number (N) of work phases as the number of processing times is equal to, for example, N=3 times defined as a default, the user answers 44 are recognized as standard answers. Subsequently, a question/answer analyzing process 46 is executed, thereby forming processing description files 26-1, 26-2, and 26-3 serving as necessary parts list tables every work phase. The processing description files 26-1 to 26-3 as much as three work phases formed as mentioned above are sent to an object forming process 48 and are included into the class definition file 36 as a business object of the standard model. By compiling the resultant file, three work objects 40-1, 40-2, and 40-3 customized in correspondence to the work phases are formed.

Figure 4A:
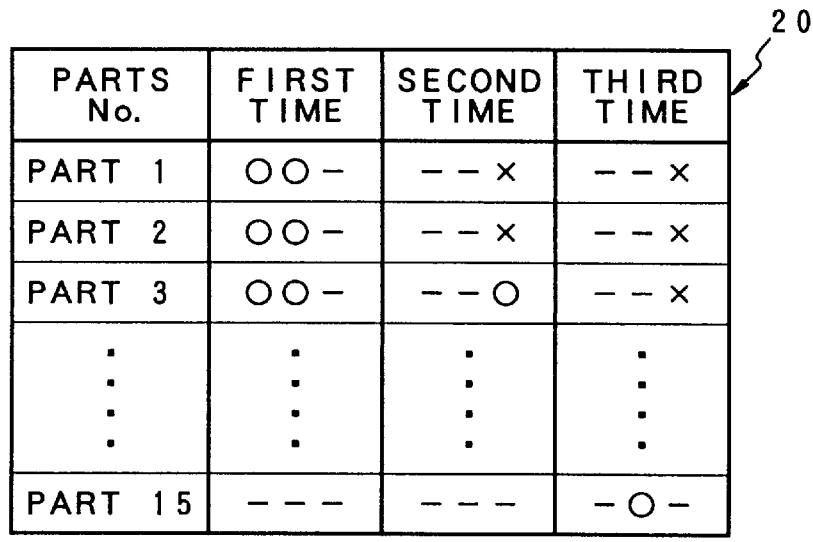
FIGS. 4A and 4B are explanatory diagrams of a processing description file and objects which are formed by the process of FIG. 3.
Figure 4B:
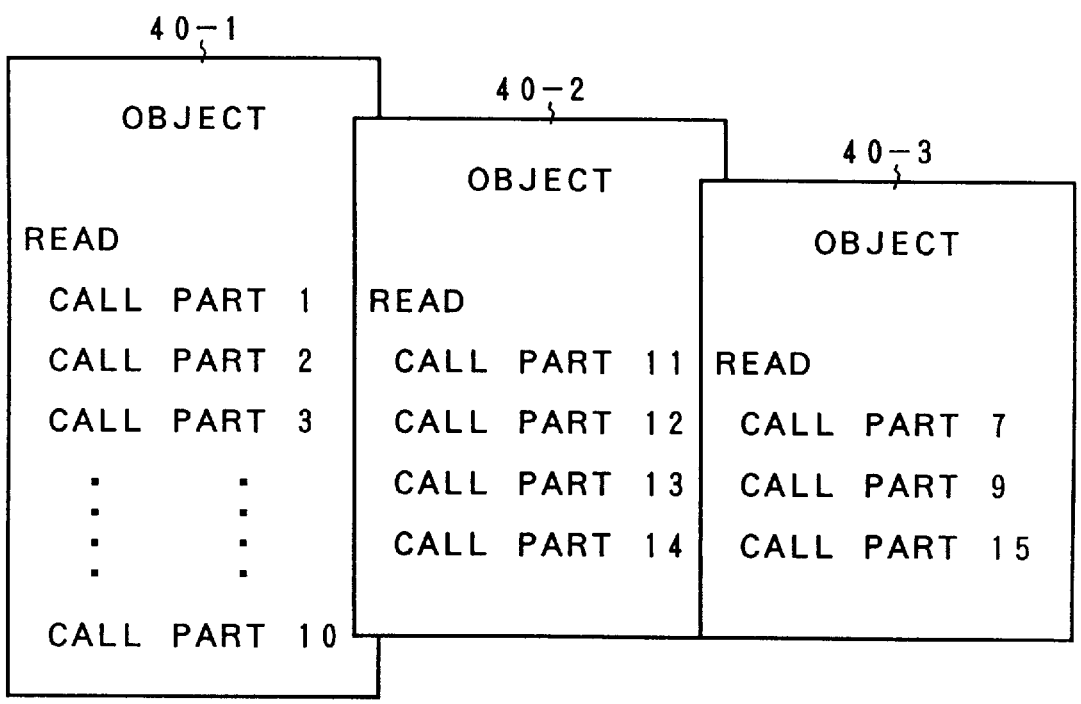

FIGS. 4A and 4B schematically show the user construction control pattern 20 and three work objects 40-1 to 40-3 formed in correspondence to the number of work phases (N=3) of the standard answers in the work object forming process in FIG. 3.

FIG. 4A shows the user construction control pattern 20 formed on the basis of the standard answers 44 to the question table 42 in FIG. 3. Since the pattern 20 has been prepared as parts objects in the class definition file 36 with respect to a plurality of kinds of data constructing the work process, the part objects are defined as parts 1, 2, 3, ... and 15. The correlation between the parts 1 to 15 as data necessary to form the work objects of the first, second and third times corresponding to the three work phases and three behaviors of data such as input, decision, and change is defined. In this instance, the correlation is shown by "o" and no correlation is shown by "x". Further, when it is not defined, such a case is shown by "-". The necessary parts list table regarding the parts 1 to 15 necessary to form the three work objects 40-1 to 40-3 from the user construction control pattern 20 is formed as processing description files 26-1 to 26-3 by the question/answer analyzing process 46 in FIG. 3.

FIG. 4B shows the customized work objects 40-1 to 40-3 formed from the necessary parts list table based on the user answers in FIG. 4A and the business objects of the standard model. In FIG. 4B, an object program having an object arrangement of the parts 1 to 15 according to the work rules defined every work phase of the user construction control pattern 20 in FIG. 1 is formed. That is, the work object 40-1 of the first time is constructed by the parts objects of the parts 1 to 10. The work object 40-2 of the second time is constructed by the parts objects of the parts 11 to 14. Further, the work object 40-3 of the third time is constructed by the parts objects of the parts 7, 9, and 15.

Figure 5A:
FIGS. 5A, 5B, and 5C are explanatory diagrams of specific examples of an application construction control pattern in FIG. 1 having a question table.
Figure 5B:
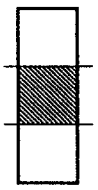
Figure 5C:

FIGS. 5A to 5C show a specific example of the application construction control pattern 14 which is used for the formation of the question table 42 and the formation of the user construction control pattern 20 by the user construction control pattern forming module in FIG. 1. The application construction control pattern 14 comprises: a question number 14-1; a question sentence 14-2; the number of question times 14-3; the number of answer patterns 14-4; an answer pattern 14-5; an answer attribute 14-6; an answer type 14-7; a next question number 14-8; a default answer 14-9; an output destination division 14-10; the number of output destination files 14-11; an output destination file name 14-12; an answer division 14-13; a processing number 14-14; and a processing descriptor 14-15. That is, as a question number 14-1, for example, question numbers 1 to 4 are set and the question number is identified. As a question sentence 14-2, a question sentence which is displayed on a question picture plane is set. As the number of question times 14-3, a numeral to identify the number of question times is set. As the number of answer patterns 14-4, the number of answer patterns which is displayed on the question picture plane is set. As an answer pattern 14-5, answer patterns indicative of the answer contents which are displayed on the question picture plane by the user selection or the like are set. The answer attribute 14-6 is used to identify whether the answer is shown by a numeral or characters. "1" identifies characters and "2" identifies a numeral. In the answer type 14-7, whether the answer is single or plural is identified. In the next question number 14-8, the next question picture plane number is set. The default answer 14-9 indicates a default answer which is displayed on the question picture plane. In the embodiment, the number (N) of phases serving as the number of processing times is set to "3". The output destination division 14-10 is used to identify whether the compiled file is outputted to the processing description file or not. In the number of output destination files 14-11, the number of files of the output destination is identified. In the output destination file name 14-12, a file name of the output destination is identified. In the answer division 14-13, whether the answer is directly outputted to the processing descriptor 14-15 or information is added to the answer and the resultant answer is outputted is identified. The processing number 14-14 indicates a retrieval number of the processing descriptor 14-15. Further, although the processing descriptor 14-15 indicates a model program of a pattern type, it is not used in this example.

Figure 6B:

FIGS. 6A and 6B show the question table 42 based on the application construction control pattern 14 of FIGS. 5A to 5C and the answer result. As questions, there are question numbers Q1, Q2, Q3, and Q4 indicative of four questions shown in the question number 14-1 in FIG. 6A. Answers are derived for the questions, respectively. First, the question number Q1 is a question such that "How many times do you enter until the sales decision?". The answer in this case is "3 times". In the next question Q2, in correspondence to the number of work phases (N=3) serving as the number of processing times defined in accordance with the answer result of the question Q1, input names of the first, second, and third times are inquired, respectively. In this case, the first time is set to "Ordering schedule input", the second time is set to "Shipping instruction input", and the third time is set to "Sales decision input". The next question Q3 shows questions and answers for a data processing designation in order to form the parts list table necessary for formation of the work objects. In the answers as well, on the basis of the definition of the number of work phases of "3 times" of the question Q1, each of I. input data
II. decision data
III. changeable data is questioned every data item in the parts Nos. 1 to 15 with respect to the 1st-time, 2nd-time, and 3rd-time work phases. The answer results to the question Q3 are summarized in a list 25-1. That is, in the list 25-1, data items having the parts list Nos. 1 to 15 corresponding to the parts objects serving as data of the work process are defined on an axis of ordinate. Three processing items of "input", "decision", and "change" which need the user answers are divisionally shown on an axis of abscissa with respect to the 1st-time, 2nd-time, and 3rd-time in correspondence to the work phases of "3 times" defined in the question Q1. The data items of the parts Nos. 1 to 15 in the list 25-1 are displayed on the question picture plane with respect to the 1st-time, 2nd-time, and 3rd-time, respectively, and a check input regarding input, decision, and change is performed by the user, thereby defining the work rules. For example, regarding the data item of "input date" of the parts No. 1, as shown by "o", it is defined that the data is the input data and is the decision data with respect to the 1st-time. The input data and decision data are not defined with respect to the 2nd-time and 3rd-time and it is defined by a mark of "x" that the data is the change impossible data. Regarding the data items of the parts Nos. 1 to 15, when the data items are divisionally examined with respect to the 1st-time, 2nd-time, and 3rd-time processes, in the ordering schedule input of the 1st-time, the definition as input data and decision data with respect to the data items of the parts Nos. 1 to 10 is performed. In the shipping instruction input of the second time, the definition as input data and decision data with respect to the parts Nos. 11 to 14 is performed. Further, the data items of the parts Nos. 1 to 10 defined as input data and decision data of the first time are defined as changeable data or change impossible data at the second time. At the third time serving as a last sales decision input, only the data item of "decision flag" of the parts No. 15 is defined as decision data and the other data items of the parts Nos. 1 to 14 are defined as changeable data or change impossible data. The last question Q4 defines a date of possible input of input data with respect to the 1st-time, 2nd-time, and 3rd-time on the basis of the data item of "shipping date" of the parts No. 10 in the list 25-1 as a reference. For example, they are defined as shown in a list 25-2. That is, in the list 25-2, input data and changeable data can be defined with respect to the input data of each of the 1st-time, 2nd-time, and 3rd-time on the basis of the shipping date as a reference. In the definition of the date data, codes A, B, and C are used. The code A indicates "until the previous day" of the shipping day. The code B indicates "until the appointed day" of the shipping day. The code C indicates "only in the past". In the list 25-2, with respect to the 1st-time input date, the code A is set to the input data and the changeable data, respectively, thereby setting to an input possible date and the changeable day until the previous day of the shipping day. The same shall also similarly apply to the 2nd-time input date. With respect to the 3rd-time input date, since there is no input data, "only in the past" is set by the code C and unchangeable data is set by a mark of "x".

Figures 7A, 7B:
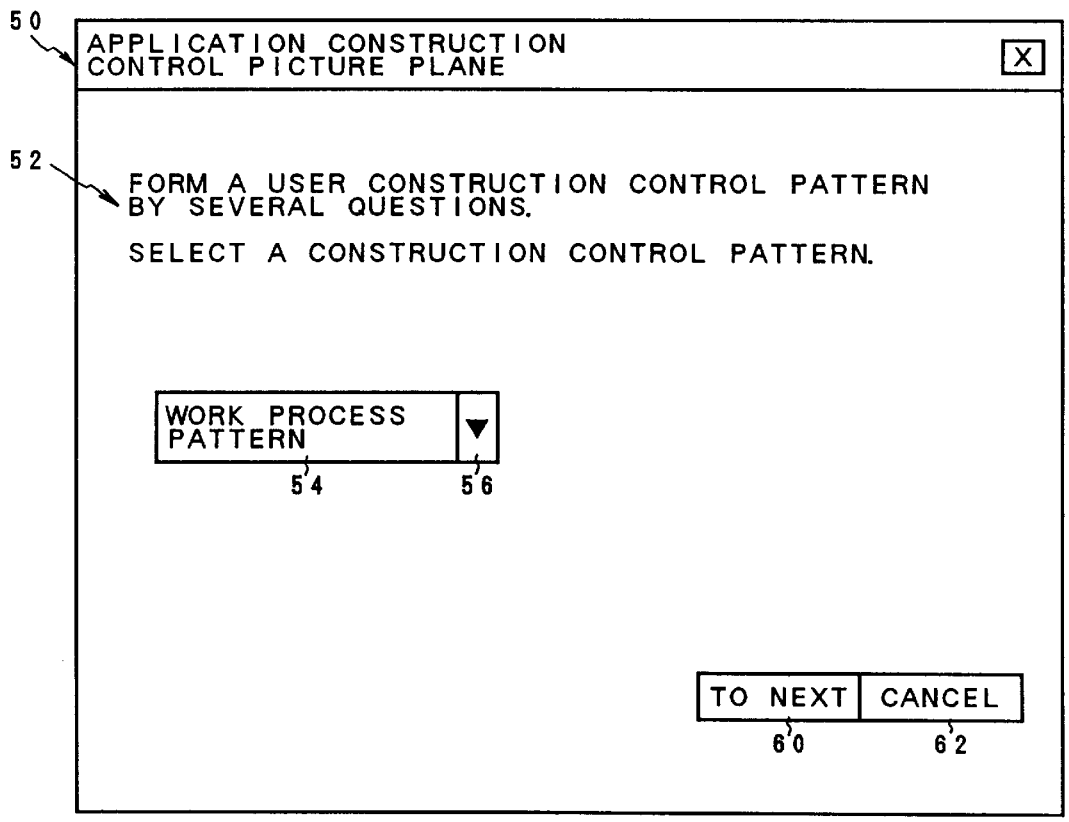
FIGS. 7A and 7B are explanatory diagrams of an application construction control picture plane and picture plane items based on the question table.

Subsequently, the question table of FIGS. 6A and 6B and the question picture plane to obtain the answers will now be specifically explained. FIG. 7A is an application construction control picture plane 50 to select the application construction control pattern 14 in FIGS. 5A to 5C. On the picture plane 50, a message of "Select a construction control pattern" which requests the selection of the construction control pattern is shown by a question column 52. A message indicative of the construction control pattern which can be selected and switched by a combo-box 56 is displayed in an answer column 54 under the question column 52. In this example, a "work process pattern" indicative of the application construction control pattern which is necessary to form the work object of the invention is displayed in the answer column 54. Item names, attributes, and item contents of the application construction control picture plane 50 are as shown in FIG. 7B. When the construction control pattern serving as a processing target is displayed in the answer column 54 by the switching and selection, a command button 60 displaying the item name "To next" is clicked, thereby advancing to the next question picture plane of FIG. 8A. When a command button 62 displaying the item name "Cancel" is clicked, a customizing process, namely, a question process is finished.

FIG. 8A shows a sales decided number designation picture plane 64 serving as a next question picture plane subsequent to the application construction control picture plane 50 of FIG. 7A. In a question column 66 of the sales decided number designation picture plane 64, a message of "Enter the number of times until the sales decision" is displayed as a question No. Q1. The number of times of questions is set to an answer column 68. As for the setting of the answer, numerals in the answer column 68 can be decreased or increased by operating a spin button 70. When the number of times serving as an answer, for example, the number of times "3" is switched and displayed in the answer column 68 as shown in the diagram, the screen advances to the next picture plane shown in FIG. 9A by clicking the command button 60. When a command button 58 displaying the item name of "Return" is clicked, the screen is returned to the previous picture plane of FIG. 7A. The item names, attributes, and item contents of the sales decided number designation picture plane 64 are as shown in FIG. 8B.

FIG. 9A shows an input name designation picture plane 72 serving as a next question picture plane subsequent to the sales decided number designation picture plane 64 of FIG. 8A. In a question column 74 of the input name designation picture plane 72, a question message of "Enter the input name" is displayed by the question No. Q2. Under the question message, answer columns 76, 78, and 80 are displayed so as to have attributes of the text boxes with respect to each of the first, second, and third times corresponding to the number of answer times "3" of the sales decided number designation picture plane 64 in FIG. 9A. As work names for the text boxes of the answer columns 76, 78, and 80, "Input of scheduled order", "Input of shipping instruction", and "Input of decided sales" are inputted as shown in the diagram. When the input is completed, the screen advances to the next question picture plane of FIG. 10A by clicking the command button 60. Item names, attributes, and item contents of the input name designation picture plane 72 are as shown in FIG. 9B.

The question picture plane of FIG. 10A is a data processing designation picture plane 82. A question message of "Which are the input, decision, change check items for the work for the ordering schedule input?" is displayed as a question No. Q3 in a question column 84. In an answer column 86, data items corresponding to the parts Nos. 1 to 15 like a list 25-1 of FIG. 6A can be displayed in a scrolling manner by operating combo-boxes 88-1 and 88-2 provided on the right of the window. Check boxes are arranged in the columns of "input", "decide", and "change" for each item. By clicking a check box 90 in correspondence to the item, a check mark "v" can be set. When the input of the scheduled order of the first time is finished, an answer column 86 of the data processing designation picture plane 82 is switched to the check picture plane for the shipping instruction input work of the second time by depressing the command button 60. When the checking process of the second time is finished, the screen is switched to the check picture plane of the sales input work of the third time by depressing the command button 60. When the checking process of the third time is finished and the command button 60 is clicked, the screen is switched to the next question picture plane of FIG. 11A. Explanations of item names, item attributes, and items of the data processing designation picture plane 82 of FIG. 10A are as shown in FIG. 10B.

FIG. 11A shows a date confirmation picture plane 92. A question message of "when is the date of possible input?" of question No. Q4 is displayed in a question column 94. An answer column 95 has answer columns 96, 98, and 100 in which combo-boxes are separately filled with an ordering schedule input of the first time, a shipping instruction input of the second time, and a sales decision input of the third time. By clicking markers 102, 104, and 106, as shown in the list 25-2 of the question Q4 in FIG. 6B, "until the previous day", "until the appointed date", and "only in the past" corresponding to the codes A, B, and C, and further, "none" are switched and displayed in the answer columns 96, 98, and 100, respectively. Item names, item attributes, and item contents in the date confirmation picture plane 92 are as shown in FIG. 11B.

FIG. 12 is a flowchart for a construction control pattern forming process using the question picture planes of FIGS. 7A, 8A, 9A, 10A, and 11A for obtaining the answer results of the question table 42 as shown in FIGS. 6A and 6B on the basis of the application construction control pattern 14 in FIGS. 5A to 5C. First in step S1, the application construction control picture plane 50 is displayed as shown in FIG. 7A. The construction control pattern corresponding to the selected input is selected in step S2. Subsequently, in step S3, as shown in FIG. 8A, the designated picture plane 64 of the number of times of sales decision, that is, the number of work phases is displayed. In step S4, the designated number of input times as many as the number of times of works until the sales decision is received and registered into a pattern. In step S5, the input name designation picture plane 72 in FIG. 9A is displayed and answers to the question picture plane are made, thereby registering the input name of the work phase designated and inputted into the pattern in step S6. In step S7, the question is displayed on the data processing designation picture plane 82 of FIG. 10A. On the basis of answer results, the selected input of input, decision, and change with respect to each item for every work phase is registered into the pattern in step S8. In step S9, the date confirmation picture plane 92 in FIG. 11A is displayed as a question picture plane. In step S10, according to the answers to the question picture plane, a designated input of the possible input date is registered every work phase into the pattern. By the processes in steps S1 to S10, the answer results for the question table 42 as shown in FIGS. 6A and 6B are obtained. In step S11, a user construction control pattern formed by reflecting the answer results is finally stored into a file.

Figure 13A:
FIGS. 13A and 13B are explanatory diagrams of a user construction control pattern formed from the application construction control pattern of FIGS. 5A to 5C on the basis of answer results to the question table.
Figure 13B:
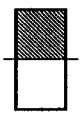

FIGS. 13A, 13B, and 14 show the user construction control pattern 20 formed on the basis of the user answers to the question picture planes formed from the application construction control pattern 14 in FIGS. 5A to 5C. The user construction control pattern 20 is constructed by a question number 20-1, the number of questions 20-2, an answer attribute 20-3, an output destination division 20-4, the number of output destination files 20-5, an output destination file name 20-6, an answer division 20-7, a processing number 20-8, a processing descriptor 20-9, the number of answers 20-10, and answer information 20-11. In the user construction control pattern 20, although the contents from the question number 20-1 to the processing descriptor 20-9 are the same as those of the application construction control pattern 14 in FIGS. 5A to 5C, the number of answers 20-10 and the answer information 20-11 in FIG. 14 are newly added. The number of answers 20-10 identifies the number of answers. In the answer information 20-11, a string of the answer results is stored. That is, the number "3" of times until the sales decision is stored in a region 21-1 of the question No. 1. "ordering schedule input", "shipping instruction input", and "sales decision input" are divisionally stored as input names of three times in a region 21-2 of the question No. 2. The input date and the shipping date in the inputs of three times are stored in a region 21-3 of the question No. 3. The user construction control pattern 20 in FIGS. 13A, 13B, and 14 formed on the basis of the user answers to the question tables is sent to the user construction control pattern analyzing module 22 as shown in FIG. 1, the answer results to the question tables are analyzed, and the processing description file as shown in FIGS. 15A to 15F serving as a necessary parts list table which is necessary to form the work object is formed.

The processing description file is constructed by a customizing definition processing description file 108 of FIG. 15A, a date customizing definition processing description file 110 of FIG. 15B, an input name processing description file 112 of FIG. 15C, a slip rule processing description file 114 of FIG. 15D, a specification rule processing description file 116 of FIG. 15E, and a date check processing description file 118 of FIG. 15F. Those six processing description files 108, 110, 112, 114, 116, and 118 have six file names corresponding to the question Nos. 1 to 4 shown in the column of the output destination file name 20-6 in the user construction control pattern 20 in FIGS. 13A and 13B. When the processing description files as shown in FIGS. 15A to 15F serving as a necessary parts list table which is necessary to form the work object are formed, a class definition file for user is formed as shown in FIGS. 16A and 16B by including the six processing description files 108, 110, 112, 114, 116, and 118 of FIGS. 15A to 15F into the class definition file 36 prepared in the file 34 in FIG. 1.

The class definition file of FIGS. 16A and 16B is constructed by a customizing definition file 120, an item definition table 122, a date check pattern table 124, a work input name table 125, a work decision rule table 126 for slip, a work decision rule table 128 for specification, and a date check pattern 130 in accordance with an order from the head. In the customizing definition file 120 at the head, the customizing definition processing description file 108 of FIG. 15A and date customizing definition processing description file 110 of FIG. 15B are included. Specifically, it is defined in a form of ('include' declaration and a file name of the processing description file)

The file name "GloSerFieldAttr.hl" of the first line shows the customizing definition processing description file 108 of FIG. 15A. The file name "GloSerDateCheck.hl" of the second line shows the date customizing definition processing description file 110 of FIG. 15B. Since it is unnecessary to customize the item definition table 122 and date check pattern table 124 in the embodiment, no processing description file is included. The input name processing description file 112 of FIG. 15C is included by a file name "GloSerFormName.hl" in the work input name table 125. The slip rule processing description file 114 of FIG. 15D is included under a file name "GloSerSlipFieldAttr.hl" in the work decision rule table 126 for slip. The specification rule processing description file 116 of FIG. 15E is included under a file name "GloSerPartFieldAttr.hl" in the work decision rule table 128 for specification. Further, the date check processing description file 118 of FIG. 15F is included under a file name "GloSerDateCheck.h2" in the date check pattern rule 130.

As shown in FIGS. 16A and 16B, when the customized class definition file for user is formed by including the processing description files formed from the answer results to the question table, the class definition file for user is sent to the compiler 32 provided for the object forming module 28 in FIG. 1 and is compiled, thereby enabling the work object 40 converted to an assembler code to be formed. As a work object in this case, as shown in FIGS. 3, 4A, and 4B, the three work objects 40-1 to 40-3 are formed in correspondence to the number (three) of work phases as the number of inputting times as answer results according to the user answer table.

Figure 17:
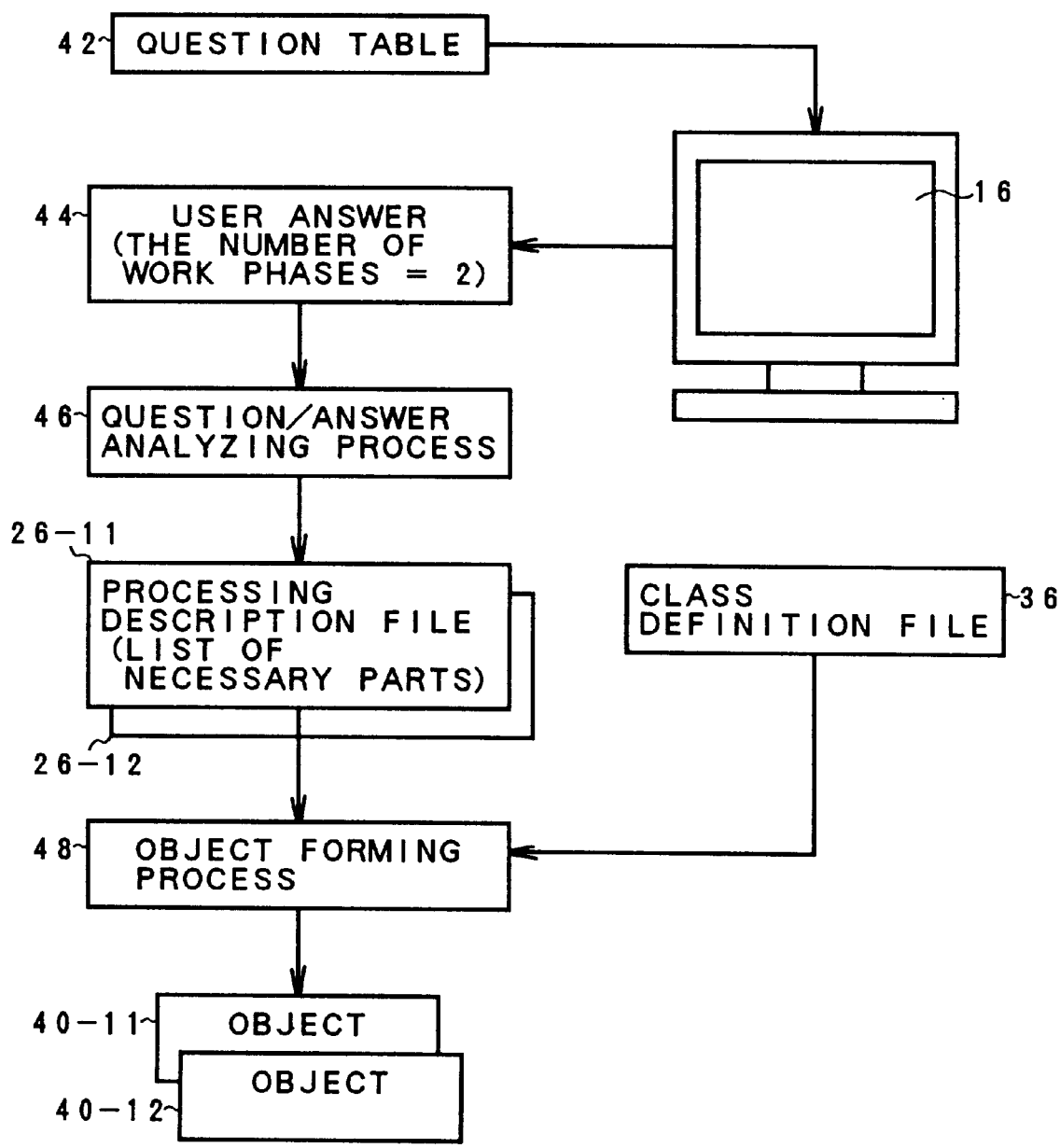
FIG. 17 is an explanatory diagram of a work object forming process based on a user answer in which the number (N) of work phases is changed to (N=2)

FIG. 17 shows an automatic forming process of a work object when an answer to the number (N) of work phases as the number of processing times is "2" in the user answers to the question table 42 in the user construction control pattern forming module 10 in FIG. 1. When the number (N) of work phases is set to 2 in the user answers 44 to the question table 42, processing description files 26-11 and 26-12 as a necessary parts list table which is necessary to form work objects corresponding to the number of work phases (N=2) are formed from the results of the question/answer analyzing process 46 for the user construction control pattern formed from the user answers. The processing description files 26-11 and 26-12 are included in the class definition file 36 serving as a business object and are subsequently compiled in the object forming process 48, two work objects 40-11 and 40-12 corresponding to the number of work phases (N=2) can be formed. That is, although the answer of the number (N) of work phases to the question table 42 is equal to (N=3) in the standard answer of FIG. 3, by setting (N=2) in this instance, the work process divided into three times in the standard answer is divided into twice in this instance, so that the work object having a quite different work flow can be automatically formed.

Figures 18A, 18B:
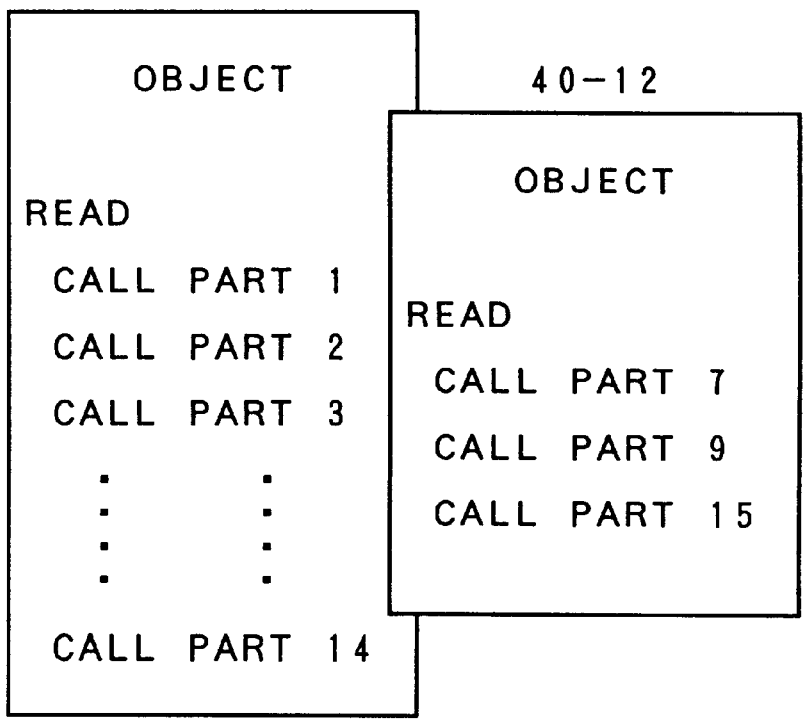
FIGS. 18A and 18B are explanatory diagrams of a processing description file and work objects which are formed by the process in FIG. 17.

FIG. 18A shows a user definition with respect to the input, decision, and change of the first and second times for the data items shown by parts Nos. 1 to 15 in the user construction control pattern 20 formed in correspondence with the number of work phases (N=2) in the user answers 44 in FIG. 17. The processing description files 26-11 and 26-12 formed on the basis of the contents of the user construction control pattern 20 are included in the class definition file 36 and are compiled, thereby enabling the work objects 40-11 and 40-12 of the first and second times corresponding to the number of work phases (N=2) as shown in FIG. 18B to be formed.

Figure 19B:
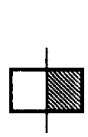

FIGS. 19A and 19B show a specific example of the question table 42 and its answer results when the number (N) of work phases in the user answers 44 in FIG. 17 is set to 2. Although the answer to the question of the number of times until the sales decision of the question Q1 in FIGS. 6A and 6B is "3 times", it is set to "twice" in case of FIGS. 19A and l9B. The number (N) of work phases is defined as "2" due to "twice" as the number of input times until the sales decision and the following questions Q2, Q3, and Q4 have question contents to which "twice" as the number of work phases is reflected. As will be obviously understood from the question table 42 and the answer results in FIGS. 6A and 6B and FIGS. 19A and 19B, in the automatic formation of the work object of the invention, the basic structure of the work object can be largely changed by setting the number of processing times as a user answer to the question table, that is, the number of work phases. Further, with respect to specific data items and the behavior of the data of every number of processing times which is determined by the number of work phases, as shown in the list 25-1 in FIG. 6A and a list 25-3 in FIG. 19A, by defining each of "input data", "decision data", and "changeable data" for the data items of the parts Nos. 1 to 15 showing the parts objects in accordance with necessity, work rules to which an intention of the user is reflected can be built. This point is also similarly applied to the definition of the data of possible input of every phase in the list 25-2 in FIG. 6B and a list 25-4 in FIG. 19B.

Figure 20:
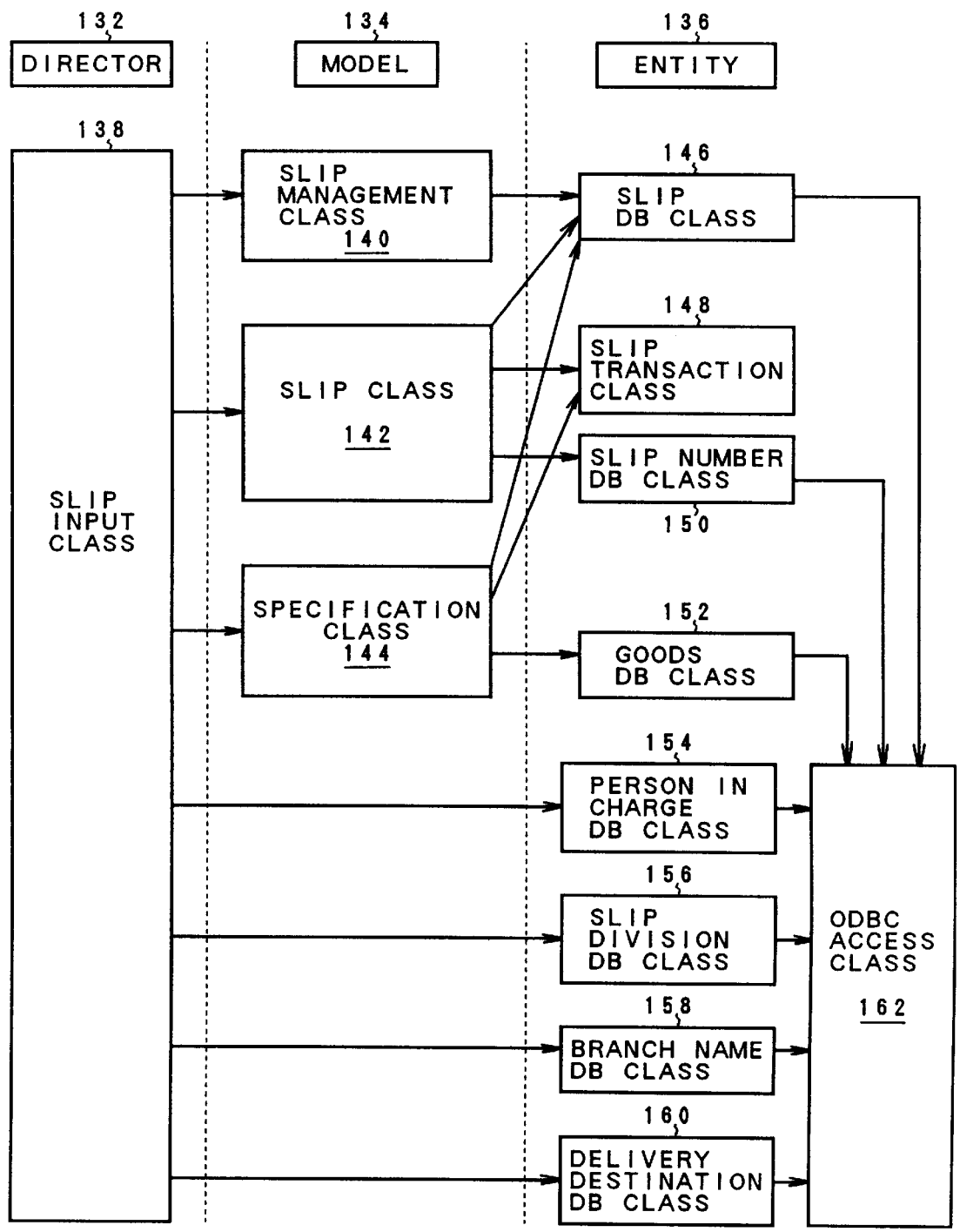
FIG. 20 is an explanatory diagram of a class construction of the work objects formed by the invention.

FIG. 20 shows a construction of classes of the work object customized by the invention. The work object is divided into three hierarchies of a director 132, a model 134, and an entity 136. In the director 132, a slip input class 138 is arranged. A slip management class 140, a slip class 142, and a specification class 144 are arranged in the model 134. Further, a slip database class 146, a slip transaction class 148, a slip number database class 150, a goods database class 152, a person in charge database class 154, a slip division database class 156, a branch name database class 158, a delivery destination database class 160, and an object database control access class 162 are arranged in the entity 136. In the classes constructing the work object, a source program is described by a syntax of "object+message" in C++ as an object-oriented language. It can be said that the object is a logical systematic member of data and the behavior of the data having an information hindering mechanism. Each of the classes can transfer a process by using an interface opened to the outside.

Figure 21:
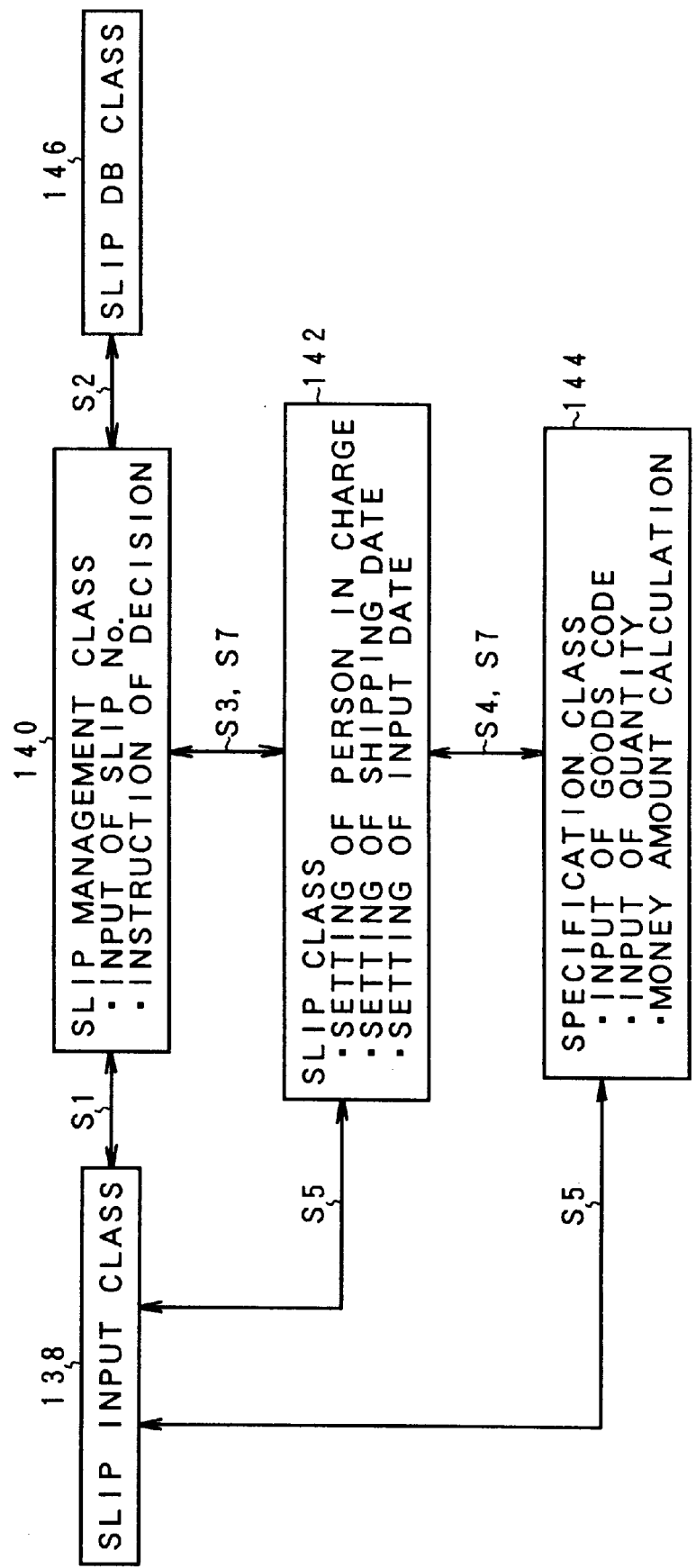
FIG. 21 is an explanatory diagram of the processing operation when the work objects in FIG. 20 are executed.
Figure 22:
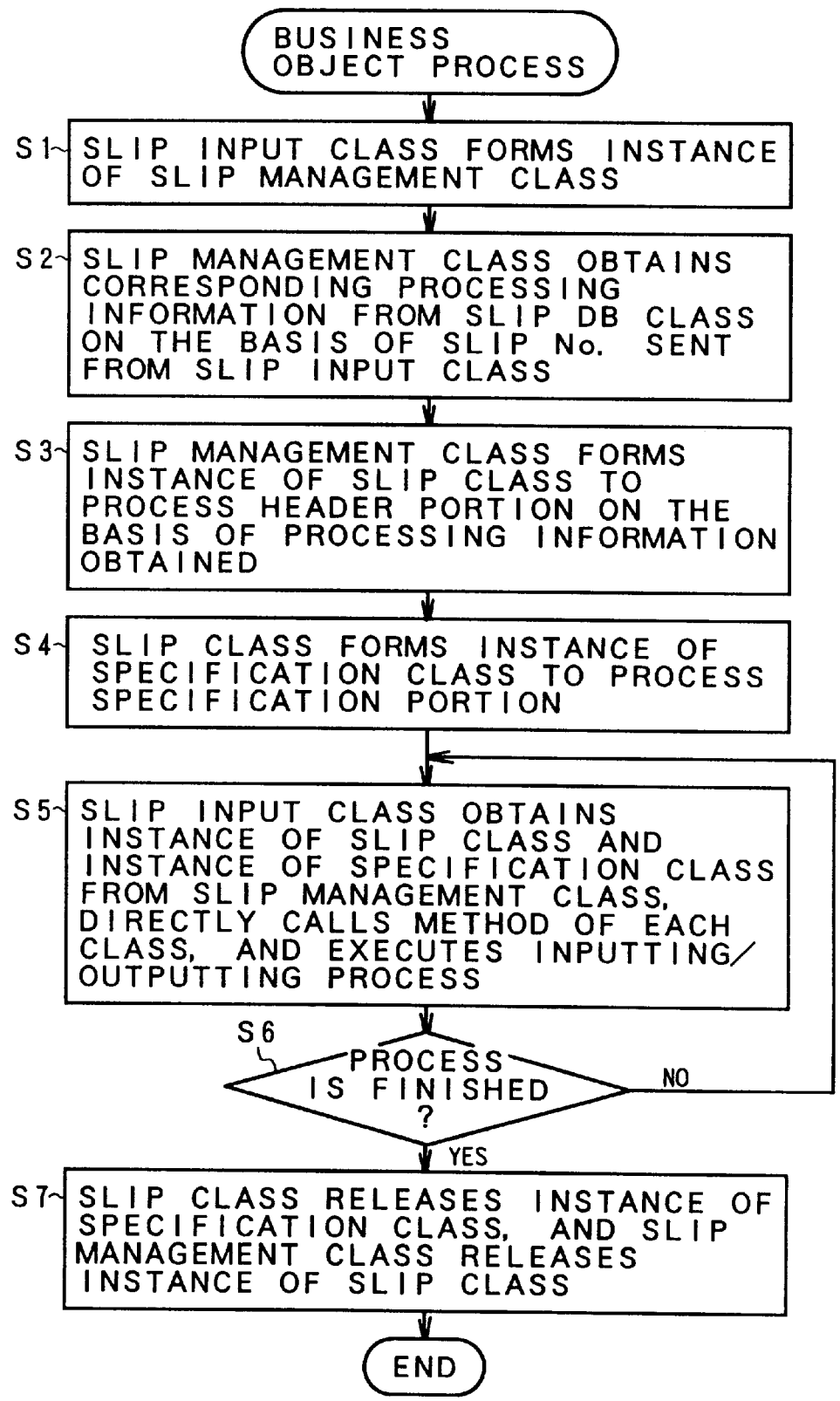
FIG. 22 is a flowchart for a work object process in FIG. 21.

FIG. 21 shows a flow for processes of the work object having the class construction of FIG. 20. The flow for the processes operates in accordance with a procedure shown in a flowchart of a business object process of FIG. 22. When the slip process is started, as shown in step S1, the slip input class 138 forms an instance of the slip management class 140. The instance denotes a process for assuring an area in a main storage. In this case, it denotes that an area of the slip management class is assured in the main storage. In step S2, the slip management class 140 obtains corresponding process information from the slip database class 146 on the basis of the slip number sent from the slip input class 138. In step S3, the slip management class 140 forms an instance of the slip class 142 for processing a header portion on the basis of the process information obtained from the slip database class 146. That is, an area of the slip class 142 is assured in the main storage. In step S4, the slip management class 140 forms an instance of the specification class 144 for processing a specification portion on the basis of the process information obtained from the slip database class 146. When the instances of the slip class 142 and specification class 144 are formed, that is, the areas can be assured in the main storage as mentioned above, in step S5, the slip input class 138 obtains the instance of the slip class 142 and the instance of the specification class 144 from the slip management class 140, directly calls a method as actual conditions for executing the process of each class, and executes inputting and outputting processes. As processes of the header portion of the slip class 142, there are I. Setting of person in charge
II. Setting of shipping date
III. Setting of input date As a specification portion of the specification class 144, there are I. Input of goods code
II. Input of quantity
III. Money amount calculation When the end of execution of the inputting process in step S5 is discriminated in step S6, the processing routine advances to step S7. The slip class 142 releases the instance of the specification class 144, and the slip management class 140 releases the instance of the slip class 142, thereby finishing the slip process based on the slip number. FIGS. 21 and 22 show a case, as an example, where the corresponding process information is obtained from the slip database class 146 provided in the entity 136 in FIG. 20 and the inputting and outputting processes are executed. With respect to a process in which the process information is obtained from a class included in the other entity 136 in accordance with information from the slip input class 138 in the work process, in a manner similar to FIGS. 21 and 22, the process of the object is also executed.

Although the customized work objects have been formed from the user construction control pattern 20 based on the user answers to the question table 42 obtained from the application construction control pattern in the foregoing embodiment, the application construction control pattern 14 itself can be also customized. For example, in the application construction control pattern 14, the predetermined data items, for example, of the parts Nos. 1 to 15 of FIGS. 6A and 6B are prepared. It can be also constructed so that the user can newly add other data items to the data items. The addition of the new data item simultaneously needs the formation of a parts object corresponding to the added data item. Since it is difficult to form the parts object on the user side, the user prepares data items which can be added as an option in the application construction control pattern 14, naturally prepares the parts object with respect to the data items prepared as an option, and adds the data items, for example, at a level of the application construction control pattern 14, thereby realizing the customization.

Although the sales transaction having the contents of order of goods, shipping, and sales decision as a work process has been described in the above-mentioned embodiment as an example, the invention can be also similarly applied to other work processes such as buying-in transaction, accounting transaction, and the like. For example, in the buying-in transaction, since there is a work flow of order, receipt of goods, and payment decision, a procedure of the automatic formation of a work object similar to that of the sales transaction shown in the embodiment can be applied.

In the accounting transaction as well, with respect to receipt of money, for example, there is a procedure of receipt of money schedule, receipt of money, and receipt of money decision. With respect to payment, there is a procedure of payment schedule, payment instruction, and payment decision. The automatic formation of the work object can be consequently realized in a manner similar to the sales transaction of the invention.

Figure 23:
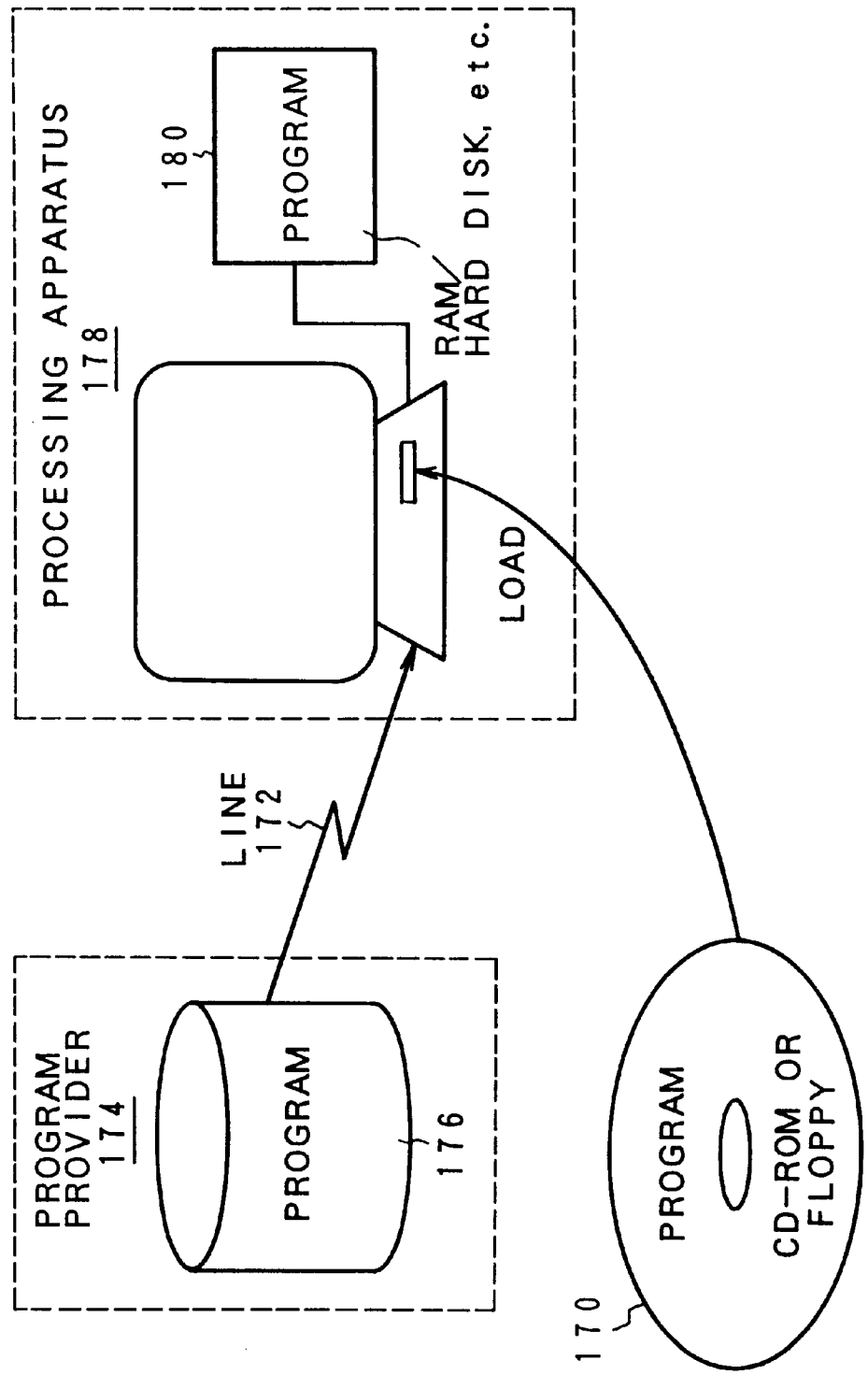
FIG. 23 is an explanatory diagram of an embodiment of a recording medium in which a program for automatically forming the work object has been recorded and which can be read by a computer according to the invention.

FIG. 23 shows an embodiment of a storage medium in which a program for executing the process for automatically forming the work object of the invention has been recorded and which can be read by a computer. As such a storage medium, there are a removable portable storage medium 170 such as CD-ROM, floppy disk, or the like, a storage device 176 of a program provider 174 who provides a program through a line 172, and a memory device 180 such as RAM, hard disk, or the like of a processing apparatus 178 in which a program has been installed. The program for automatically forming the work object provided by the storage medium of the invention is loaded into a proper processing apparatus and is executed on its main storage.

According to the invention as mentioned above, the business object corresponding to the user answer can be automatically formed only by answering of the user to the question table without needing any modification of a source program regarding the work object and a parameter setting, and the work object can be easily customized with a high degree of freedom in correspondence with a desire of the user without needing a process which requires an advanced skill of the object-oriented language such as C++ or the like and a deep understanding to a package.

According to the invention, the user can arbitrarily set the number of processes of the work process, that is, the number of work phases as an answer to the question table, and the work objects of the number as many as the set number of work phases are automatically formed. Even in case of a complicated work process, by freely setting the number of work phases, the automatic formation of the work object which can flexibly cope with a change in development or the work process on the user side can be realized.

The invention is not limited to the foregoing embodiments but incorporates proper modifications within the spirit and scope of the invention without departing from the objects and advantages of the invention. The invention is also not limited by the numerical values shown in the embodiments.

What is claimed is:

1. An apparatus for automatically forming a work object, comprising:

a user construction control pattern forming module for dividing a work process into data and behavior of the data and correlating said data and the behavior of said data on the basis of answers of the user to a question table, thereby forming a user construction control pattern in which work rules necessary to realize a work have been defined;

a user construction control pattern analyzing module for analyzing said user construction control pattern and forming a necessary parts list table which is necessary to form a work object to which said work rules answered by the user are reflected; and an object forming module for forming customized work objects on the basis of a business object to realize the data and the behavior of the data constructing said work process and said necessary parts list table.

2. An apparatus according to claim 1, wherein said user construction control pattern forming module forms a user construction control pattern in which the number of processing times until the completion of the work has been defined on the basis of the answers of the user to the question table, said user construction control pattern analyzing module divisionally forms the necessary parts list table which is necessary to form the work object every said number of processing times, and said object forming module divisionally forms customized work objects every said number of processing times.

3. An apparatus according to claim 2, wherein said user construction control pattern forming module defines the number of inputting times as the number of processing times until the completion of said work on the basis of the user answers to the question table and forms a user construction control pattern in which an input name of every said number of inputting times, a date of possible input to be checked every said number of inputting times, and work rules of every said plurality of data have been defined, and said user construction control pattern analyzing module analyzes said user construction control pattern and forms a processing description file as a necessary parts list table corresponding to each of said number of inputting times, said input name of every said number of processing times, said date of possible input, and said work rules.

4. An apparatus according to claim 3, wherein said user construction control pattern forming module forms a user construction control pattern in which the presence or absence of the input, the presence or absence of the decision, and the presence or absence of a change have been defined as said work rules on the basis of the user answers, and said user construction control pattern analyzing module analyzes said user construction control pattern and forms a processing description file corresponding to each of the presence or absence of the input, the presence or absence of the decision, and the presence or absence of the change which were defined as said work rules.

5. An apparatus according to claim 2, wherein said work process is a work process for summing sales after goods were ordered and shipped, and said user construction control pattern forming module defines ordering data, shipping instruction data, and sales decision data as data of said work.

6. An apparatus according to claim 5, wherein said user construction control pattern forming module defines an input date, a slip number, a customer code, a customer name, a goods code, a goods name, a unit price, a quantity, a money amount, and the like as said ordering data, defines a shipping date, a location, a track number, a direct dispatch instruction, an instructed flag, and the like as said shipping instruction data, and further defines a decision flag as said sales decision data.

7. An apparatus according to claim 5, wherein said user construction control pattern forming module selectively defines any one of a previous day, an appointed day, a past, and the like as a date of possible input by using the shipping date as a reference every said number of inputting times, thereby allowing a date checking process to be executed.

8. An apparatus according to claim 1, wherein said user construction control pattern forming module forms said user construction control pattern by correcting a prepared standard construction control pattern on the basis of the user answers to the question table.

9. An apparatus according to claim 2, wherein said object forming module comprises:

a class definition file in which a business object as a standard model has been defined and stored as a class; and a class definition file forming module for forming a class definition file for user which was customized while including the processing description file formed by said user construction control pattern analyzing module into said class definition file, and said object forming module compiles said class definition file for user and forms work objects of the number corresponding to said number of processing times.

10. A method of automatically forming a work object, comprising:

a user construction control pattern forming step of dividing a work process into data and behavior of the data and correlating said data and the behavior of said data on the basis of answers of the user to a question table, thereby forming a user construction control pattern in which work rules necessary to realize a work have been defined;

a user construction control pattern analyzing step of analyzing said user construction control pattern and forming a necessary parts list table which is necessary to form a work object to which said work rules answered by the user are reflected; and an object forming step of forming customized work objects on the basis of a business object to realize the data and the behavior of the data constructing said work process and said necessary parts list table.

11. A method according to claim 10, wherein in said user construction control pattern forming step, a user construction control pattern in which the number of processing times until the completion of the work has been defined is formed on the basis of the answers of the user to the question table, in said user construction control pattern analyzing step, a necessary parts list table which is necessary to form the work object is divisionally formed every said number of processing times, and in said object forming step, customized work objects are divisionally formed every said number of processing times.

12. A method according to claim 11, wherein in said user construction control pattern forming step, the number of inputting times is defined as the number of processing times until the completion of said work on the basis of the user answers to the question table and a user construction control pattern in which an input name of every said number of inputting times, a date of possible input to be checked every said number of inputting times, and work rules of said every plurality of data have been defined is formed, and in said user construction control pattern analyzing step, said user construction control pattern is analyzed and a processing description file as a necessary parts list table corresponding to each of said number of inputting times, said input name of every said number of processing times, said date of possible input, and said work rules is formed.

13. A method according to claim 12, wherein in said user construction control pattern forming step, a user construction control pattern in which the presence or absence of the input, the presence or absence of the decision, and the presence or absence of a change have been defined as said work rules on the basis of the user answers is formed, and in said user construction control pattern analyzing step, said user construction control pattern is analyzed and a processing description file corresponding to each of the presence or absence of the input, the presence or absence of the decision, and the presence or absence of the change which were defined as said work rules is formed.

14. A method according to claim 11, wherein said work process is a work process for summing sales after goods were ordered and shipped, and in said user construction control pattern forming step, ordering data, shipping instruction data, and sales decision data are defined as data of said work.

15. A method according to claim 14, wherein in said user construction control pattern forming step, an input date, a slip number, a customer code, a customer name, a goods code, a goods name, a unit price, a quantity, a money amount, and the like are defined as said ordering data, a shipping date, a location, a track number, a direct dispatch instruction, and an instructed flag are defined as said shipping instruction data, and further, a decision flag is defined as sales decision data.

16. A method according to claim 14, wherein in said user construction control pattern forming step, any one of a previous day, an appointed day, a past, and the like is selectively defined as a date of possible input by using the shipping date as a reference every said number of inputting times, thereby allowing a date checking process to be executed.

17. A method according to claim 10, wherein in said user construction control pattern forming step, said user construction control pattern is formed by correcting a prepared standard construction control pattern on the basis of the user answers to the question table.

18. A method according to claim 11, wherein said object forming step comprises:

a class definition file in which a business object as a standard model has been defined and stored as a class;

a class definition file forming step of forming a class definition file for user which was customized while including the processing description file formed by said user construction control pattern analyzing step into said class definition file; and a compiling step of compiling said class definition file for user and forming work objects of the number corresponding to said number of processing times.

19. A recording medium on which a program to form a work object has been recorded and which can be read by a computer, wherein said program has:

a user construction control pattern forming module for dividing a work process into data and behavior of the data and correlating said data and the behavior of said data on the basis of answers of the user to a question table, thereby defining work rules necessary to realize the work and forming a user construction control pattern in which the number of processing times until the completion of the work has been defined on the basis of the answers of the user to said question table;

a user construction control pattern analyzing module for analyzing said user construction control pattern and forming a necessary parts list table which is necessary to form a work object to which said work rules answered by the user are reflected every said number of processing times; and an object forming module for divisionally forming customized work objects every said number of processing times on the basis of a business object to realize the data and the behavior of the data constructing said work process and said necessary parts list table.

* * * * *

UNITED STATES PATENT AND TRADEMARK OFFICE
CERTIFICATE OF CORRECTION

PATENT NO.:     6,074,431
DATED     :     June 13, 2000
INVENTOR(S):    Jun WATANABE, et al.

It is certified that an error appears in the above-identified patent and that said Letters Patent is hereby corrected as shown below:

On the title page, item

[56]   References Cited

Change "5,495,577" to --5,495,567--.

Signed and Sealed this

Third Day of April, 2001

Attest:

NICHOLAS P. GODICI

Attesting Officer    Acting Director of the United States Patent and Trademark Office